(12) United States Patent
Kim et al.

(10) Patent No.: US 11,002,451 B2
(45) Date of Patent: May 11, 2021

(54) AIR CONDITIONER

(71) Applicant: SAMSUNG ELECTRONICS CO., LTD., Suwon-si (KR)

(72) Inventors: Byung Ghun Kim, Suwon-si (KR); Hyun-Ho Kim, Suwon-si (KR); Hyeonu Park, Suwon-si (KR); Woo Seog Song, Yongin-si (KR); Jang Jung Lee, Hwaseong-si (KR); Jei Min Choi, Suwon-si (KR); Jong Moon Kim, Hwaseong-si (KR); Hong Yeol Moon, Hwaseong-si (KR); Chul Byung Park, Ansan-si (KR); Hyeong Joon Seo, Suwon-si (KR); Seung-Jun Yoon, Suwon-si (KR); Jun Hwa Lee, Suwon-si (KR); Hyeong Kyu Cho, Suwon-si (KR); Jun Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 324 days.

(21) Appl. No.: 15/850,366

(22) Filed: Dec. 21, 2017

(65) Prior Publication Data

US 2018/0172288 A1 Jun. 21, 2018

(30) Foreign Application Priority Data

Dec. 21, 2016 (KR) .................. 10-2016-0175988
Apr. 28, 2017 (KR) .................. 10-2017-0055457

(51) Int. Cl.
*F24F 1/0011* (2019.01)
*F24F 13/14* (2006.01)
(Continued)

(52) U.S. Cl.
CPC .......... *F24F 1/0011* (2013.01); *F24F 1/0014* (2013.01); *F24F 1/0025* (2013.01); *F24F 1/0047* (2019.02); *F24F 13/14* (2013.01)

(58) Field of Classification Search
None
See application file for complete search history.

(56) References Cited

U.S. PATENT DOCUMENTS 7,040,101 B2 * 5/2006 Takeda ...................... A61L 9/22
62/78
9,513,020 B2 * 12/2016 Ikeda .................... F24F 1/0014
(Continued)

FOREIGN PATENT DOCUMENTS

CA         2554328         1/2008
CN      204901976     12/2015
(Continued)

OTHER PUBLICATIONS

Machine translation of JP2002081733, attached as "JP2002081733_wipo_translate.pdf" (Year: 2002).*
(Continued)

*Primary Examiner* — Avinash A Savani
*Assistant Examiner* — Martha M Becton
(74) *Attorney, Agent, or Firm* — Staas & Halsey LLP

(57) ABSTRACT

An air conditioner according to an aspect of the present invention includes a housing arranged to be mounted on or embedded in a ceiling, a cover panel coupled to a lower portion of the housing, the cover panel including an inlet and an outlet, a blower fan configured to draw in air into the housing through the inlet and discharge air out of the housing through the outlet and a blade configured to open and close the outlet, the blade including a plurality of through holes to control the air discharged out of the housing through the outlet while the blade closes the outlet. With this (Continued)

structure, the air conditioner can discharge air in various ways by varying the wind direction, the wind speed, and the air amount of the discharged air.

11 Claims, 23 Drawing Sheets

(51) Int. Cl.
*F24F 1/0025* (2019.01)
*F24F 1/0047* (2019.01)
*F24F 1/0014* (2019.01)

(56) References Cited

U.S. PATENT DOCUMENTS

| | | | |
|---|---|---|---|
| 10,302,326 B2 * | 5/2019 | Son | F24F 11/77 |
| 10,458,673 B2 * | 10/2019 | Cho | F24F 13/14 |
| 2006/0234622 A1 | 10/2006 | Holyoake | |
| 2010/0192611 A1 * | 8/2010 | Yamaguchi | F24F 13/14 62/291 |
| 2013/0167578 A1 * | 7/2013 | Ikeda | F24F 13/22 62/411 |
| 2014/0227961 A1 * | 8/2014 | Yasutomi | F24F 11/72 454/325 |
| 2014/0273805 A1 * | 9/2014 | Yasutomi | F24F 13/14 454/322 |
| 2016/0281998 A1 * | 9/2016 | Fujita | F24F 1/0047 |
| 2017/0067681 A1 * | 3/2017 | Kim | F24F 13/14 |
| 2018/0119984 A1 * | 5/2018 | Cho | F24F 13/14 |
| 2018/0274814 A1 * | 9/2018 | Cho | F24F 13/14 |
| 2018/0313552 A1 * | 11/2018 | Lee | F24F 1/0047 |
| 2018/0356107 A1 * | 12/2018 | Lee | F24F 1/0014 |
| 2019/0056120 A1 * | 2/2019 | Cho | F24F 13/14 |
| 2019/0212017 A1 * | 7/2019 | Kwon | F24F 11/79 |
| 2019/0219277 A1 * | 7/2019 | Kim et al. | F24F 1/0047 |
| 2020/0018512 A1 * | 1/2020 | Wang | F24F 1/0014 |

FOREIGN PATENT DOCUMENTS

| | | | |
|---|---|---|---|
| CN | 105444387 | 3/2016 | |
| CN | 106225078 | 12/2016 | |
| EP | 2420754 | 2/2012 | |
| EP | 2716990 | 4/2014 | |
| JP | 8-94160 | 4/1996 | |
| JP | 2001-304609 | 10/2001 | |
| JP | 2002081733 A * | 3/2002 | F24F 13/14 |
| JP | 2012-78031 | 4/2012 | |
| JP | 2013-133963 | 7/2013 | |
| JP | 2014-173738 | 9/2014 | |
| JP | 2017116146 A * | 6/2017 | F24F 13/14 |
| KR | 10-2016-0091290 | 8/2006 | |
| KR | 10-2008-0060845 | 7/2008 | |
| KR | 10-2016-0098885 | 8/2016 | |

OTHER PUBLICATIONS

Machine translation of JP2017116146, attached as "JP2017116146_wipo_translate.pdf" (Year: 2017).*
JPO abstract of JP02018091507A provided as "JP02018091507A_JPO_abstract.pdf" (Year: 2018).*
Machine translation of CN204901976, attached as "CN204901976_wipo_translate.pdf" (Year: 2020).*
Chinese Office Action dated Dec. 23, 2019 in Chinese Patent Application No. 201711392238.3.
European Office Action dated Aug. 1, 2019 in European Patent Application No. 17209133.2.
Extended European Search Report dated Apr. 19, 2018 in European Patent Application No. 17209133.2.

* cited by examiner

AIR CONDITIONER

CROSS-REFERENCE TO RELATED APPLICATION

This application claims priority to and the benefit of Korean Patent Applications No. 10-2016-0175988 filed on Dec. 21, 2016 and No. 10-2017-0055457 filed on Apr. 28, 2017, the disclosures of which are incorporated herein by reference in its entirety.

BACKGROUND

1. Field of the Invention

The present disclosure relates to an air conditioner for controlling an air discharge current in various ways.

2. Discussion of Related Art

An air conditioner is equipped with a compressor, a condenser, an expansion valve, an evaporator, a blower fan, and the like, for controlling indoor temperature, humidity, air currents, etc., using refrigeration cycles. The air conditioner may include an indoor unit placed indoors and an outdoor unit placed outdoors.

The indoor unit of the air conditioner includes a heat exchanger for exchanging heat between a refrigerant and air, a blower fan for circulating air, and a motor for driving the blower fan, to cool or heat the indoor space.

The blower fan draws in room air, facilitates heat exchange of the air through the heat exchanger, and discharges the heat-exchanged air back into the indoor space. For this, the blower fan needs to rotate at more than a certain speed (rpm) taking into account the heat exchange efficiency of the heat exchanger, and discharges the air through an outlet in the form of direct airflow to a certain distance.

The user might feel unpleasant, cold, or hot if the direct airflow reaches the user.

SUMMARY OF THE INVENTION

An aspect of the present disclosure provides an air conditioner for discharging an air current in various methods.

Another aspect of the present disclosure provides an air conditioner capable of cooling or heating the indoor space while preventing the direct airflow from reaching the user.

In accordance with one aspect of the present disclosure, an air conditioner includes a housing to be mounted on or embedded in a ceiling; a cover panel coupled to a lower portion of the housing, the cover panel including an inlet and an outlet; a blower fan configured to draw in air into the housing through the inlet and discharge air out of the housing through the outlet; and a blade configured to open and close the outlet, the blade including a plurality of through holes to control the air discharged out of the housing through the outlet while the blade closes the outlet.

The cover panel may include a guide forming the outlet, the guide extending from an upstream end of the outlet to a downstream end of the outlet, and the guide may include a first guide surface arranged to guide air in a first direction and a second guide surface arranged to change the first direction of the air guided by the first guide surface into a second direction, and the second direction is nearer to the ceiling than the first direction is.

The first guide surface may be formed as a curved surface and the second guide surface may be formed as a flat plane.

The first guide surface may be formed to have less inclination of a tangent at a portion of the first guide surface that is farther from the blower fan.

The second guide surface may be formed to be parallel with the ceiling.

The second guide surface may be formed to incline more at a portion of the second guide surface farther from the blower fan.

The first guide surface and the second guide surface may be formed as flat surfaces, and the second guide surface may have a smaller inclination than that of the first guide surface.

The blade may comprise a blade body on which the plurality of through holes are formed and coupling ribs protruding from the blade body, and the blade body may include an inner end and an outer end at a farther distance away from the inlet than the inner end is.

The thickness of the outer end may be smaller than that of the inner end.

The blade body may have a section with increasing thickness in a direction from the outer end toward the inner end.

The through holes, among the plurality of through holes, that are farther from the blower fan may be formed to incline toward the outer end.

The blade may be configured to cover an edge of the cover panel.

The cover panel may include a panel outlet with a plurality of panel through holes to discharge air out of the housing.

The air conditioner may further include a panel discharge flow path configured to guide air to the panel outlet and an open/close member configured to open and shut the panel discharge flow path.

The open/close member may be configured to operate by being engaged with operation of the blade.

In accordance with another aspect of the present disclosure, an air conditioner may include a housing to be mounted on or embedded in a ceiling; a cover panel coupled to a lower portion of the housing, the cover panel including an inlet and an outlet; a heat exchanger arranged inside the housing; a blower fan configured to draw in air into the housing through the inlet and discharge air out of the housing through the outlet; and a blade configured to open and close the outlet, and the cover panel may include a guide extending from an upstream end of the outlet to a downstream end of the outlet to form the outlet, and the guide may include a first guide surface arranged to guide air in a first direction and a second guide surface arranged to change the air guided by the first guide surface into a second direction that is nearer to the ceiling than the first direction.

The first guide surface may be formed as a curved surface and the second guide surface may be formed as a flat plane.

The first guide surface and the second guide surface may be formed as flat surfaces, and the second guide surface may have a smaller inclination than that of the first guide surface.

In accordance with still another aspect of the present disclosure, an air conditioner may include a housing to be mounted on or embedded in a ceiling; a cover panel coupled to a lower portion of the housing, the cover panel having an inlet and an outlet; a blower fan configured to draw in air into the housing through the inlet and discharge air out of the housing through the outlet; and a blade configured to open and close the outlet, and the blade may be configured to cover an edge of the cover panel.

The cover panel may include a guide extending from an upstream end of the outlet to a downstream end of the outlet to form the outlet, and the guide may include a guide rear end corresponding to the downstream end of the outlet, and the guide rear end may be configured to form an edge of the cover panel.

In accordance with still another aspect of the present disclosure, an air conditioner may include a housing to be mounted on or embedded in a ceiling; a cover panel coupled to a lower portion of the housing, the cover panel including an inlet and an outlet; a blower fan configured to draw in air into the housing through the inlet and discharge air out of the housing through the outlet; and a blade formed at the outlet, the blade including a plurality of through holes, and the cover panel may include an airflow controller arranged near the outlet to reduce a speed of air discharged through the plurality of through holes.

The airflow controller may include a first airflow controller and a second airflow controller placed further down on a downstream side than the first airflow controller.

The first airflow controller may be configured to reduce the speed of air flowing toward the second airflow controller.

The second airflow controller may be configured to guide a direction of air discharged through a gap between the cover panel and the blade.

The second airflow controller may be configured to guide the air discharged through the gap between the cover panel and the blade to a center portion of the blade for the air to flow in a direction to wrap around the blade.

The first airflow controller and the second airflow controller may protrude toward the outlet.

The air conditioner may further include a space maintainer protrusion formed to protrude from the cover panel or the blade to maintain a gap between the cover panel and the blade.

The first airflow controller may include a first low point portion, a first descending plane formed further up on an upstream side than the first low point portion is and descending toward the first low point portion, and a first ascending plane formed further down on a downstream side than the first low point portion and ascending from the first low point portion.

The second airflow controller may include a second low point portion, a second descending plane formed further up on an upstream side than the second low point portion is and descending toward the second low point portion, and a second ascending plane extending up from the second low point portion.

The airflow controller may include a high point portion where the first ascending plane and the second descending plane meet.

If a difference in height between the first low point portion and the high point portion is H1, and a difference in height between the second low point portion and the high point portion is H2, then $0.001 \le |H1-H2|/H1 \le 100$.

If a horizontal distance of the first low point portion and the second low point portion is P, then $0.001 \le P/H1 \le 500$.

The blade may include a blade air direction controller configured to guide air discharged through a gap between the cover panel and the blade to a center portion of the blade for the air to flow in a direction to wrap around the blade.

The blade air direction controller may be formed at an inner end of the blade as a plane concavely curved toward the center of pivoting of the blade.

In accordance with another aspect of the present disclosure, an air conditioner may include a housing arranged to be hung on or buried in a ceiling; a cover panel coupled to a lower portion of the housing and equipped with an inlet and an outlet; a blower fan configured to draw in air into the housing through the inlet and discharge air out of the housing through the outlet; and a blade configured to pivot between an open position to open the outlet and a close position to shut the outlet and have a plurality of through holes formed therein, and if the blade is at the close position, the blade covers an edge of the cover panel and the plurality of through holes incline toward an outer end as they grow farther from the blower fan.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 13 shows a state of operating still air mode, and FIG. 14 shows a state of operating routine mode;

FIG. 15 shows a state of operating still air mode, and FIG. 16 shows a state of operating routine mode;

DETAILED DESCRIPTION OF EXEMPLARY EMBODIMENTS

Figure 1:
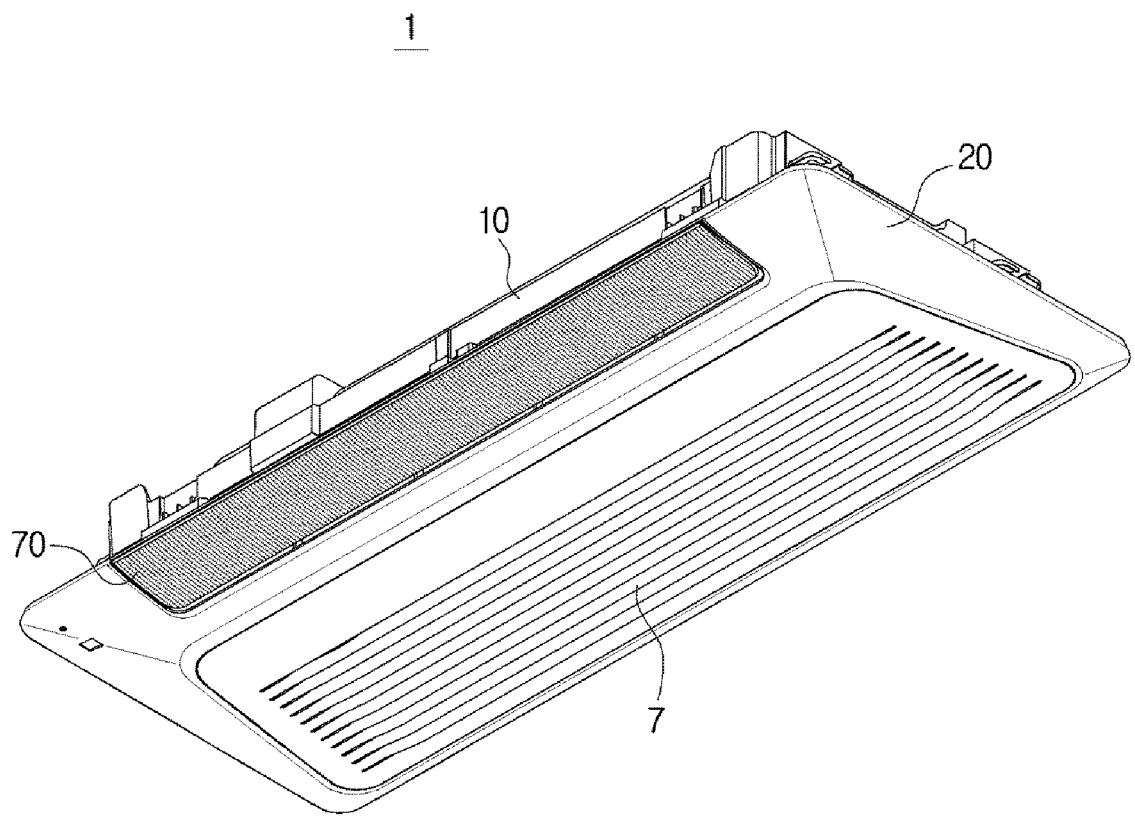
FIG. 1 is a bottom perspective view of an air conditioner, according to an embodiment of the present disclosure.

Embodiments of the present disclosure are only the most preferred examples and provided to assist in a comprehensive understanding of the disclosure as defined by the claims and their equivalents. Accordingly, those of ordinary skilled in the art will recognize that various changes and modifications of the embodiments described herein can be made without departing from the scope and spirit of the disclosure.

Reference will now be made in detail to embodiments, examples of which are illustrated in the accompanying drawings, wherein like reference numerals refer to the like elements throughout.

Figure 2:
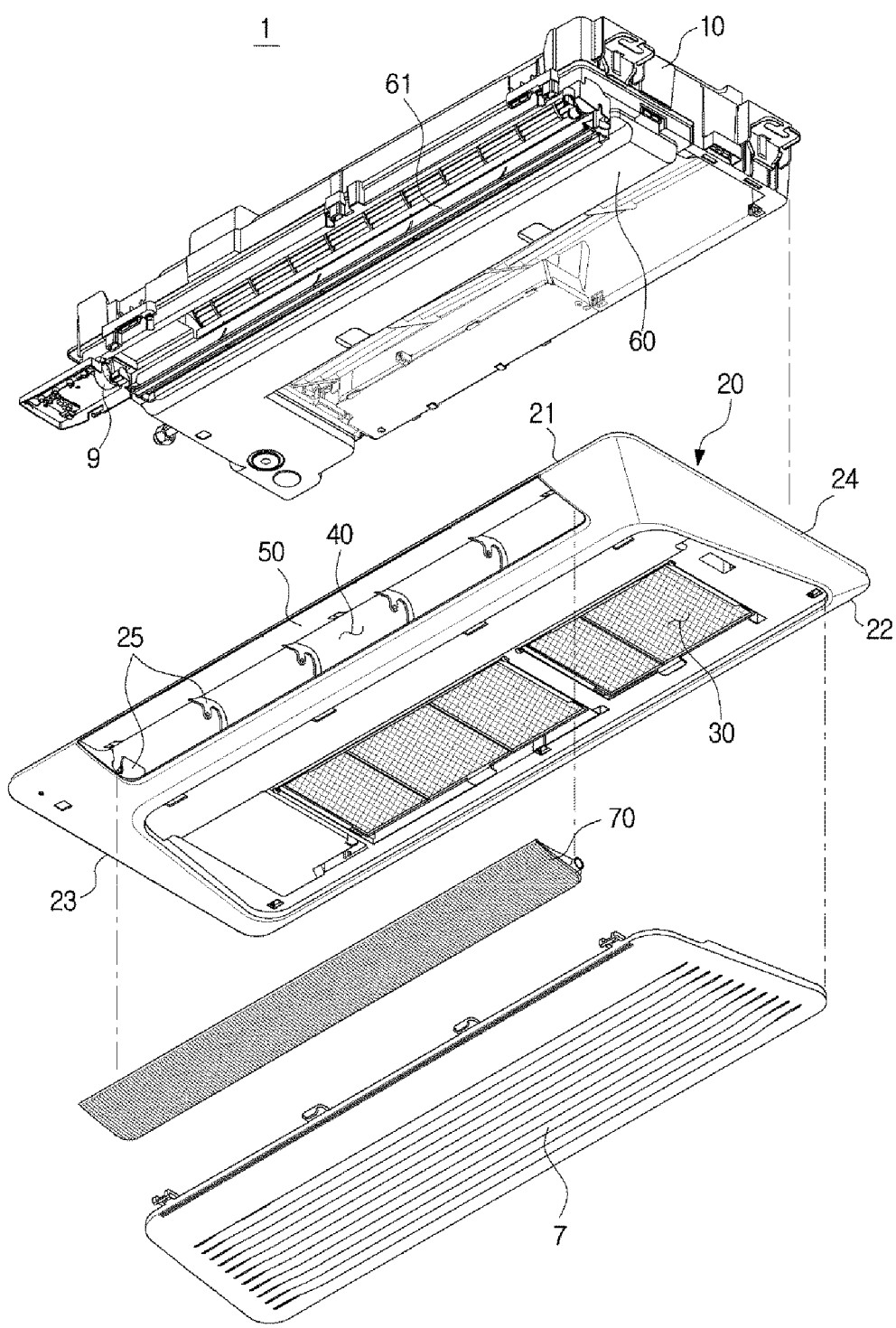
FIG. 2 shows the air conditioner of FIG. 1 with a cover panel separated therefrom.
Figure 3:
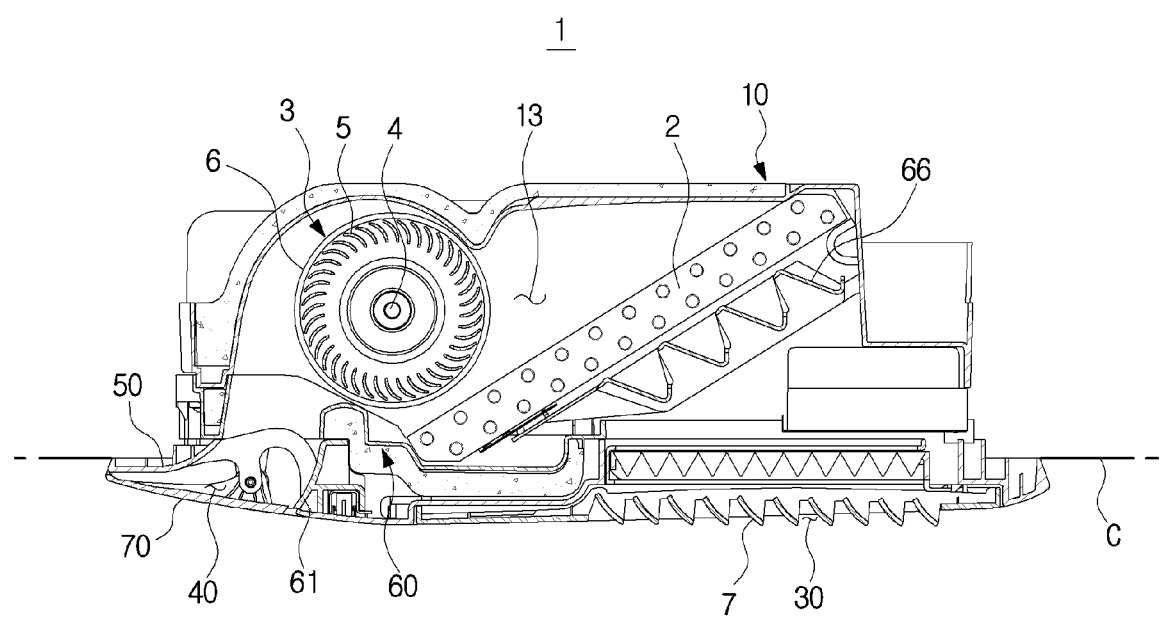
FIG. 3 is a side cross-sectional view illustrating main configurations of the air conditioner of FIG. 1.

FIG. 1 is a bottom perspective view of an air conditioner, according to an embodiment of the present disclosure. FIG. 2 shows the air conditioner of FIG. 1 with a cover panel separated therefrom. FIG. 3 is a side cross-sectional view illustrating main configurations of the air conditioner of FIG. 1.

Referring to FIGS. 1 to 3, an embodiment of an air conditioner will be described.

An air conditioner 1 may include a housing 10 hung on or buried in the ceiling C, a cover panel 20 coupled with a lower portion of the housing 10 and equipped with an inlet 30 and an outlet 40, a heat exchanger 2 arranged inside the housing 10, and a blower fan 3 configured to draw in air into the housing 10 through the inlet 30 and discharge the air out of the housing 10 through the outlet 40.

The housing 10 may be shaped like a box with an open bottom. Specifically, the housing 10 may have a rectangular top wall and side walls extending down from the respective edges of the top wall. Inside the housing 10, the heat exchanger 2 and the blower fan 3 are contained and there may further be an internal flow path 13 formed to guide the air drawn in through the inlet 30 to the outlet 40.

The cover panel 20 may be coupled to the lower portion of the housing 10 to cover the open bottom of the housing 10. The cover panel 20 may have the form of a rectangle with front, back, left and right edges 21, 22, 23, and 24, and the edges 21 and 22 are formed to be longer than the other edges 23, 24.

The inlet 30 may be provided in the cover panel 20 to be close to the edge 22, and the outlet 40 may be provided in the cover panel 20 to be close to the edge 21. The outlet 40 may have an elongated form along the length of the edge 21, 22. A grill 7 may be coupled to the inlet 30 to filter out dust from the air drawn in.

The blower fan 3 may be a cross-flow fan. Unlike an ordinary axial-flow fan that blows air in a direction parallel to the axis, the cross-flow fan may blow air in a direction perpendicular to the axis. The blower fan 3 may include a rotation shaft 4, a plurality of wings 5 centered on the rotation shaft 4 and arranged along the circumferential direction, and a supporting plate 6 to support the wings 5. The blower fan 3 may be arranged such that the rotation shaft 4 lies in parallel with the length of the outlet 40.

The heat exchanger 2 for cooling air by exchanging heat with the air may be arranged on a side to the blower fan 3. The heat exchanger 2 may be arranged to incline at an angle from the horizon to be perpendicular to the flow of air flowing in the internal flow path 13 of the housing 10.

A drain pan 60 may be placed under the heat exchanger 2 to collect condensate water produced by the heat exchanger 2. The water collected by the drain pan 60 may be drained out of the air conditioner 1 through a pump and a hose.

There may be a sub drain 66 arranged between the heat exchanger 2 and the inlet 30 to first collect the condensate water falling from the heat exchanger 2 and guide it into the drain pan 60. There may be a control box arranged between the sub drain 66 and the inlet 30 to drive the air conditioner 1.

With the configurations, when the blower fan 3 rotates, air may be drawn into the internal flow path 13 through the inlet 30, may be cooled through the heat exchanger 2, and may be discharged out of the internal flow path 13 through the outlet 40.

The air conditioner 1 may include a blade 70 arranged at the outlet 40 to control the direction, speed, and amount of the air to be discharged through the outlet 40. The blade 70 may be pivotally arranged to open and shut the outlet 40. Furthermore, there may be a plurality of through holes 74 (see FIG. 5) formed on the blade 70 to discharge air while the outlet 40 is shut by the blade 70.

In the case that air is discharged through the plurality of through holes 74, the speed of the air may decrease and the amount of the air may get small, compared with the case where the air is discharged through the outlet 40.

The blower fan 3 draws in room air, facilitates heat exchange of the air through the heat exchanger 2, and discharges the heat-exchanged air back into the room. For this, the blower fan 3 needs to rotate at more than a certain speed (rpm) taking into account the heat exchange efficiency of the heat exchanger 2, and accordingly, discharges the air through the outlet 40 in the form of direct airflow to a certain distance.

On the contrary, the air discharged through the through holes 74 while the blade 70 shuts the outlet 40 is at a relatively low speed and is small in amount, so the direct airflow may not reach the user and the room may be gradually cooled or heated. In this way, the mode in which air is discharged through the through holes 74 prevents the direct airflow from reaching the user, and may thus be referred to as still air mode.

Furthermore, in an embodiment, in addition to the still air cooling/heating through the through holes 74, the air conditioner 1 may cool or heat the indoor space by discharging air through the outlet 40 toward the ceiling C to prevent the direct airflow from reaching the user but slowly fall down from the ceiling C. In other words, the air conditioner 1 in accordance with an embodiment of the present disclosure may be configured to discharge air toward the ceiling C, which may be called long airflow mode.

Various discharging structures of the air conditioner in accordance with embodiments of the present disclosure will now be described in detail with reference to associated accompanying drawings.

Figure 4:
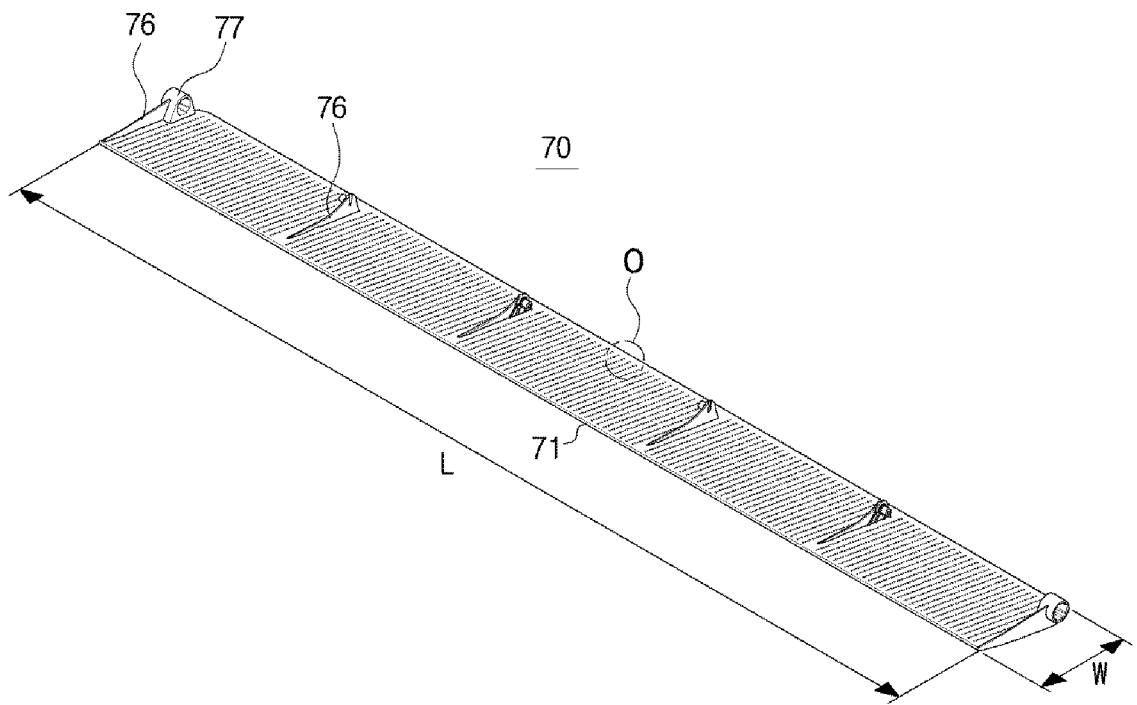
FIG. 4 is a perspective view illustrating a blade of the air conditioner of FIG. 1.
Figure 5:
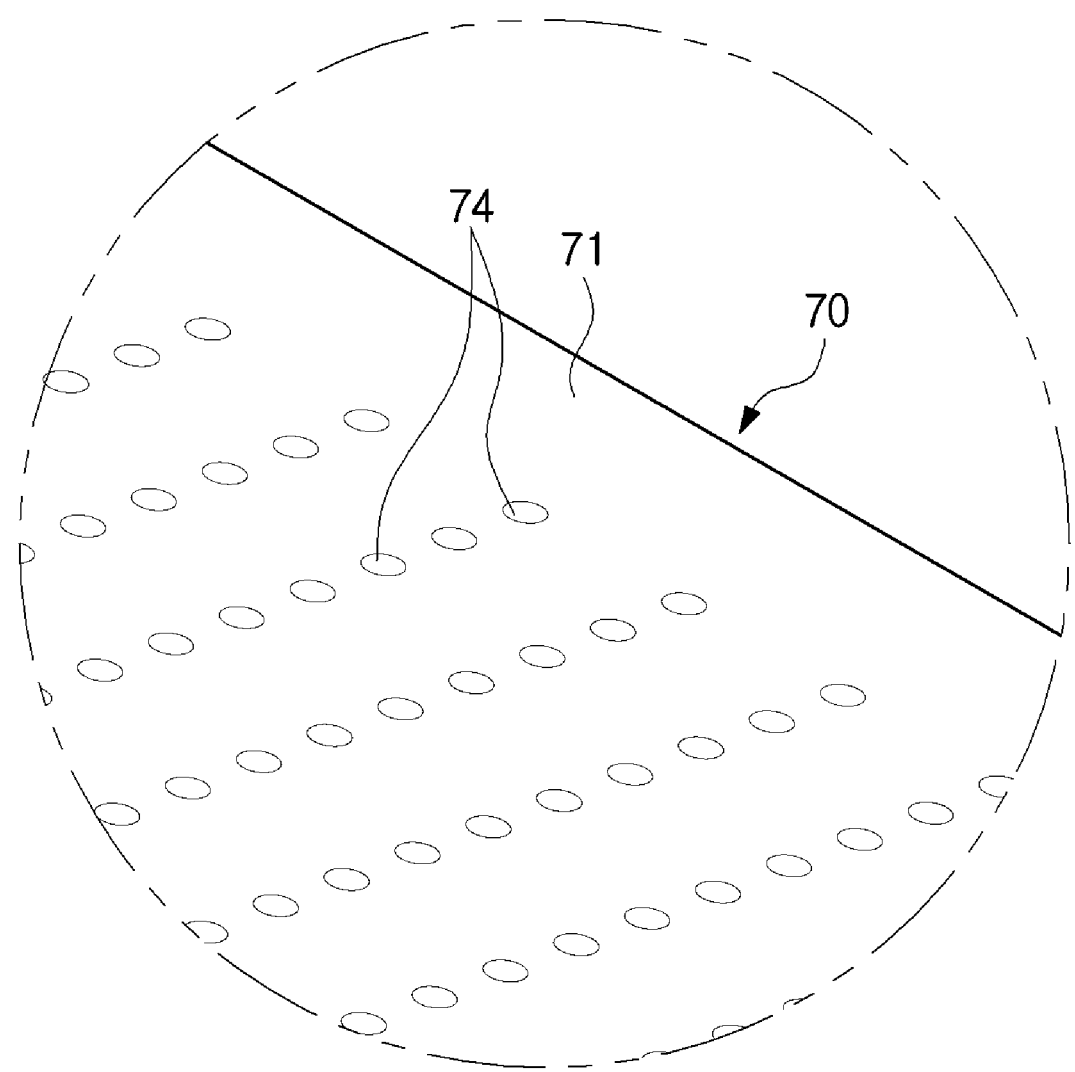
FIG. 5 is an enlarged view of portion 'O' of FIG. 4.
Figure 6:
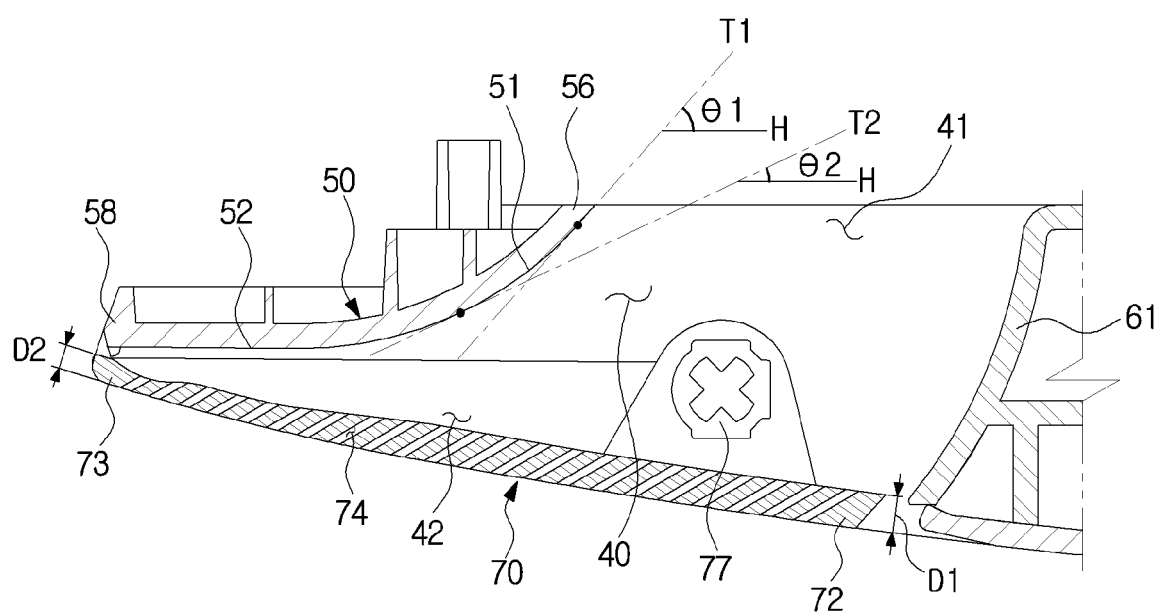
FIG. 6 is an enlarged view of the perimeter of an outlet of the air conditioner of FIG. 1.
Figure 7:
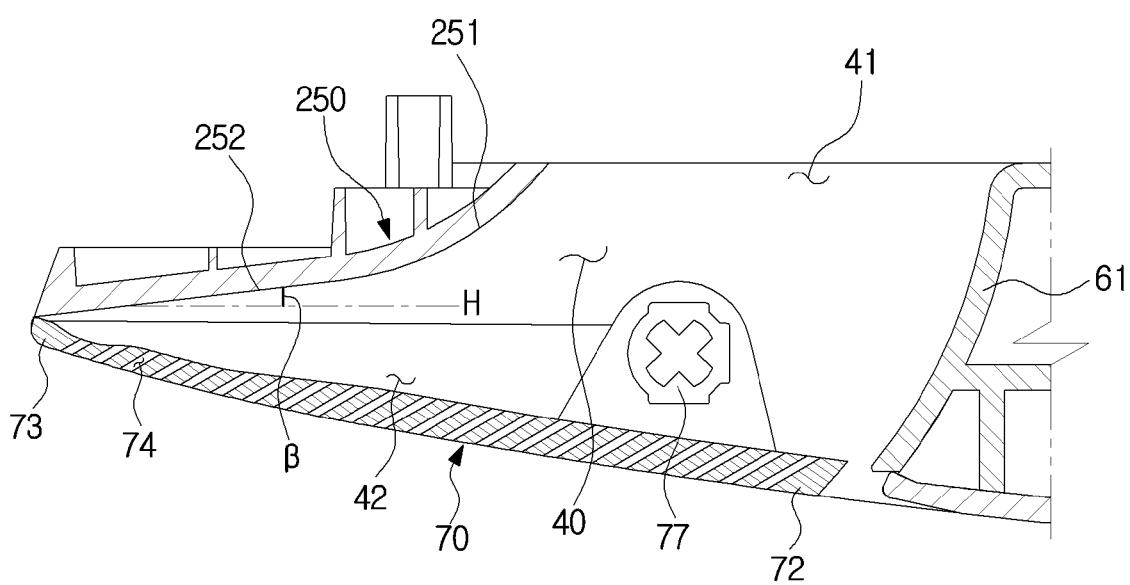
FIG. 7 is a modified example of a guide of FIG. 6.
Figure 8:
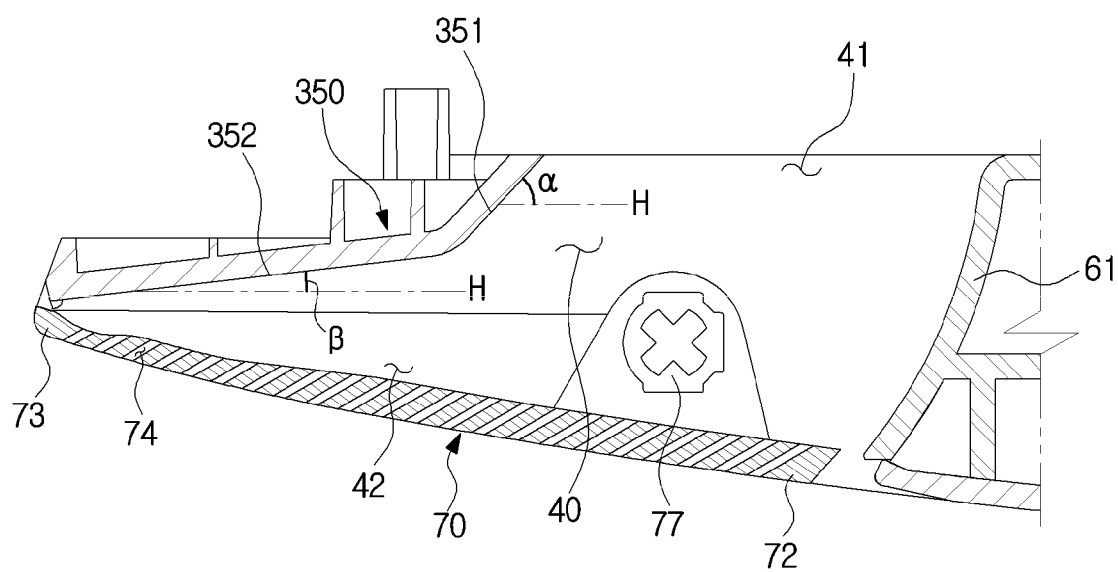
FIG. 8 is another modified example of the guide of FIG. 6.
Figure 9:
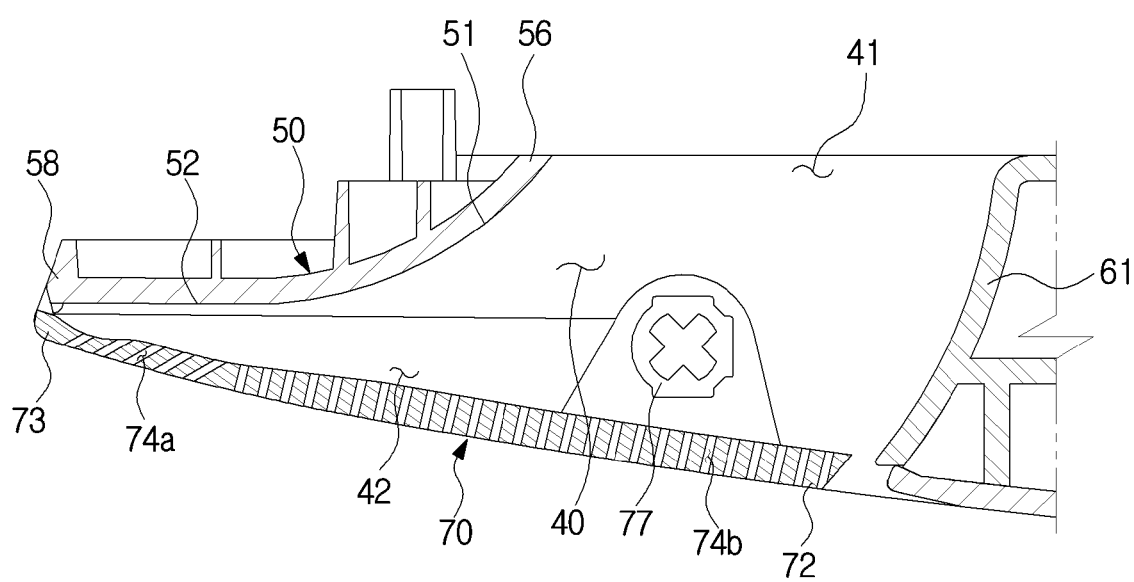
FIG. 9 is a modified example of through holes of FIG. 6.

FIG. 4 is a perspective view illustrating a blade of the air conditioner of FIG. 1. FIG. 5 is an enlarged view of portion 'O' of FIG. 4. FIG. 6 is an enlarged view of the perimeter of the outlet of the air conditioner of FIG. 1. FIG. 7 is a modified example of a guide of FIG. 6. FIG. 8 is another modified example of the guide of FIG. 6. FIG. 9 is a modified example of through holes of FIG. 6.

Referring to FIGS. 4 to 9, the cover panel 20 may include a guide 50. The drain pan 60 may include a guide 61. The outlet 40 may be formed between the guides 50 and 61. Alternatively, the guide 61 may be arranged separately from the drain pan 60.

The guide 50 may be placed farther from the inlet 30 than the guide 61 is. Accordingly, the guide 50 is called an outer guide 50 and the guide 61 is called an inner guide 61. The guides 50 and 61 may extend from an upstream end 41 of the outlet 40 to a downstream end 42 of the outlet 40.

The guide 50 may include a first guide surface 51 provided to guide air in a first direction A (see FIG. 11) and a second guide surface 52 provided to change the direction of the air guided by the first guide surface 51 to a second direction B (see FIG. 11), which is nearer to the ceiling C than the first direction is.

With the configurations, the air conditioner 1 may discharge the air drawn in through the inlet 30 arranged in a lower portion toward the ceiling C through the outlet 40 arranged in a lower portion, thereby minimizing a pressure loss due to resistance of the flow path.

The first guide surface 51 may be formed as a curved surface and the second guide surface 52 may be formed as a flat surface. The first guide surface 51 may be formed such that the farther it is from the blower fan 3, the less inclined the tangent is. For example, an inclination θ2 of a tangent T2 may be less than an inclination θ1 of a tangent T1.

The second guide surface 52 may be placed in parallel with the ceiling C. If the ceiling C in the indoor space is in parallel with the horizontal plane H, the second guide surface 52 may be said to be in parallel with the horizontal plane H. It may also be said to be in parallel with the top wall of the housing 10.

The guide 50 may include a front end 56 corresponding to the upstream end 41 of the outlet 40 and a rear end 58 corresponding to the downstream end 42 of the outlet 40. The rear end 58 of the guide 50 may form the edge 21 of the cover panel 20.

The blade 70 may be provided to open and shut the outlet 40 and may include a blade body 7 with the plurality of through holes 74 formed thereon and coupling ribs 76 protruding from the blade body 71.

Specifically, the blade body 71 may be provided to close not the upstream end 41 or middle portion of the outlet 40 but the downstream end 42 of the outlet 40. For this, the blade body 71 may have length L and width W corresponding to the length and width of the downstream end 42 of the outlet 40.

As described above, the rear end 58 of the guide 50 forms the edge 21 of the cover panel 20 and the blade body 71 is provided to shut the downstream end 42 of the outlet 40, and as a result, the blade body 71 may cover the end 21 of the cover panel 20. In other words, when the air conditioner 1 is viewed from below, the edge 21 of the cover panel 20 may be hidden by the blade 70.

The plurality of through holes 74 may each have a diameter of 1 to 2 mm and may be uniformly distributed in the entire area or partial area of the blade body 71. The blade body 71 may include an inner end 72 and an outer end 73 at a farther distance from the inlet 30 than the inner end 72 is. The inner end 72 may be relatively close to a pivot shaft portion 77 of the blade 70, and the outer end 73 may be relatively far from the pivot shaft portion 77 of the blade 70.

With the structure of the outlet in accordance with an embodiment of the present disclosure, a smaller amount of air flows to the outer end 73 than to the inner end 72, so the air passing the through holes 74 formed around the outer end 73 may have a slower speed than the air passing the through holes 74 formed around the inner end 72. Consequently, more dew condensation may occur around the outer end 73 than around the inner end 72 due to the temperature difference.

To solve this problem, the thickness D2 of the outer end 73 of the blade body 71 may be set to be smaller than the thickness D1 of the inner end 72. Accordingly, the length of the through holes 74 formed around the outer end 73 may be shorter than the length of the through holes 74 formed around the inner end 72.

Furthermore, the blade body 71 may have a section in which the thickness D increases from the outer end 73 toward the inner end 72. Moreover, the blade body 71 may be formed to have an increasing thickness D from the outer end 73 to the inner end 72.

In addition, to solve the phenomenon of dew condensation, the through holes 74 may be slantingly formed toward the outer end 73 as they grow farther from the blower fan 3.

As described above, as the through holes 74 grow farther from the blower fan 3, they are slantingly formed toward the outer end 73, so the speed and amount of the air discharged toward the outer end 73 increases, minimizing the dew condensation. Furthermore, the air may be discharged near to the ceiling C and may thus be sent farther.

The pivot shaft portion 77 may be arranged in the coupling rib 76 for pivoting the blade 70, and pivotally combined with blade mounts 25 (see FIG. 2) formed on the cover panel 20. A blade drive motor 9 (see FIG. 2) may be equipped in the housing 10 and connected to the pivot shaft portion 77 to deliver driving force.

As shown in FIG. 7, as a modified example of the guide 50, a guide 250 may include a first guide surface 251 provided to guide air in the first direction and a second guide surface 252 provided to change the direction of the air guided by the first guide surface 251 to the second direction B, which is nearer to the ceiling C than the first direction is. The first guide surface 251 may be formed as a curved surface and the second guide surface 252 may be formed as a flat surface. The first guide surface 251 may be formed such that as the first guide surface 251 grows farther from the blower fan 3, the inclination of the tangent becomes smaller.

The first guide surface 252 may be slantingly formed such that as the second guide surface 251 grows farther from the inlet 30, it goes downward. For example, the second guide surface 252 inclines at an angle of β from the horizontal plane H.

As shown in FIG. 8, as another modified example of the guide 50, a guide 350 may include a first guide surface 351 provided to guide air in the first direction and a second guide surface 352 provided to change the direction of the air guided by the first guide surface 351 to the second direction, which is nearer to the ceiling C than the first direction is.

The first guide surface 351 and the second guide surface 352 may be formed as flat planes. The inclination β of the second guide surface 352 from the horizontal plane H is smaller than the inclination α of the first guide surface 351 from the horizontal plane H. The second guide surface 352 may be placed in parallel with the ceiling C or may be inclined at an angle from the ceiling C.

As shown in FIG. 9, as a modified example of the through holes, the through holes 74a, 74b may include inclined through holes 74a at an angle and upright through holes 74b. For example, among the through holes 74a, 74b, some of them, i.e., 74a, may be formed to have an inclination.

The through holes 74a around the outer end 73 of the blade 70 may be slantingly formed while the through holes 74b around the inner end 72 of the blade 70 may be vertically formed. This structure may prevent dew condensation from slowdown of the air around rather the inner end 72 of the blade 70 if the through holes were all inclined.

Figure 10:
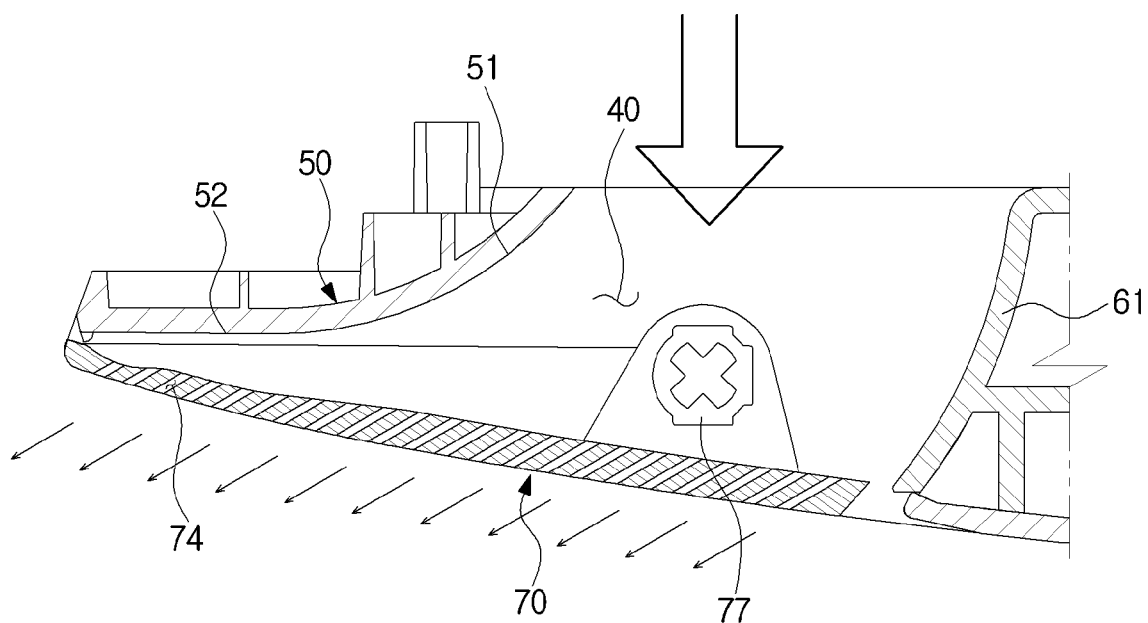
FIG. 10 shows a state of operating still air mode of the air conditioner of FIG. 1.
Figure 11:
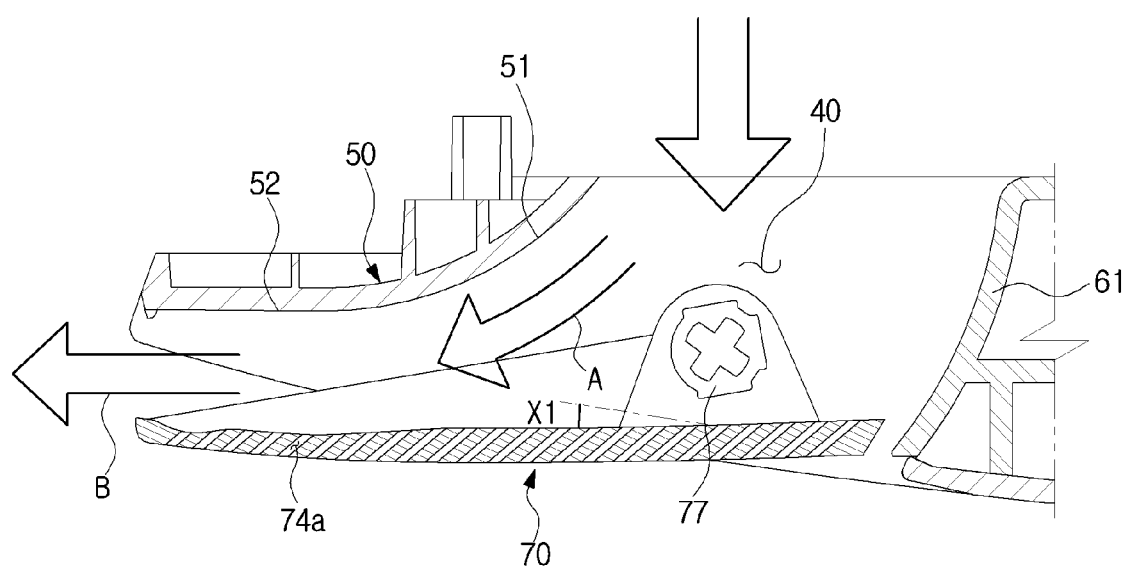
FIG. 11 shows a state of operating long airflow mode of the air conditioner of FIG. 1.
Figure 12:
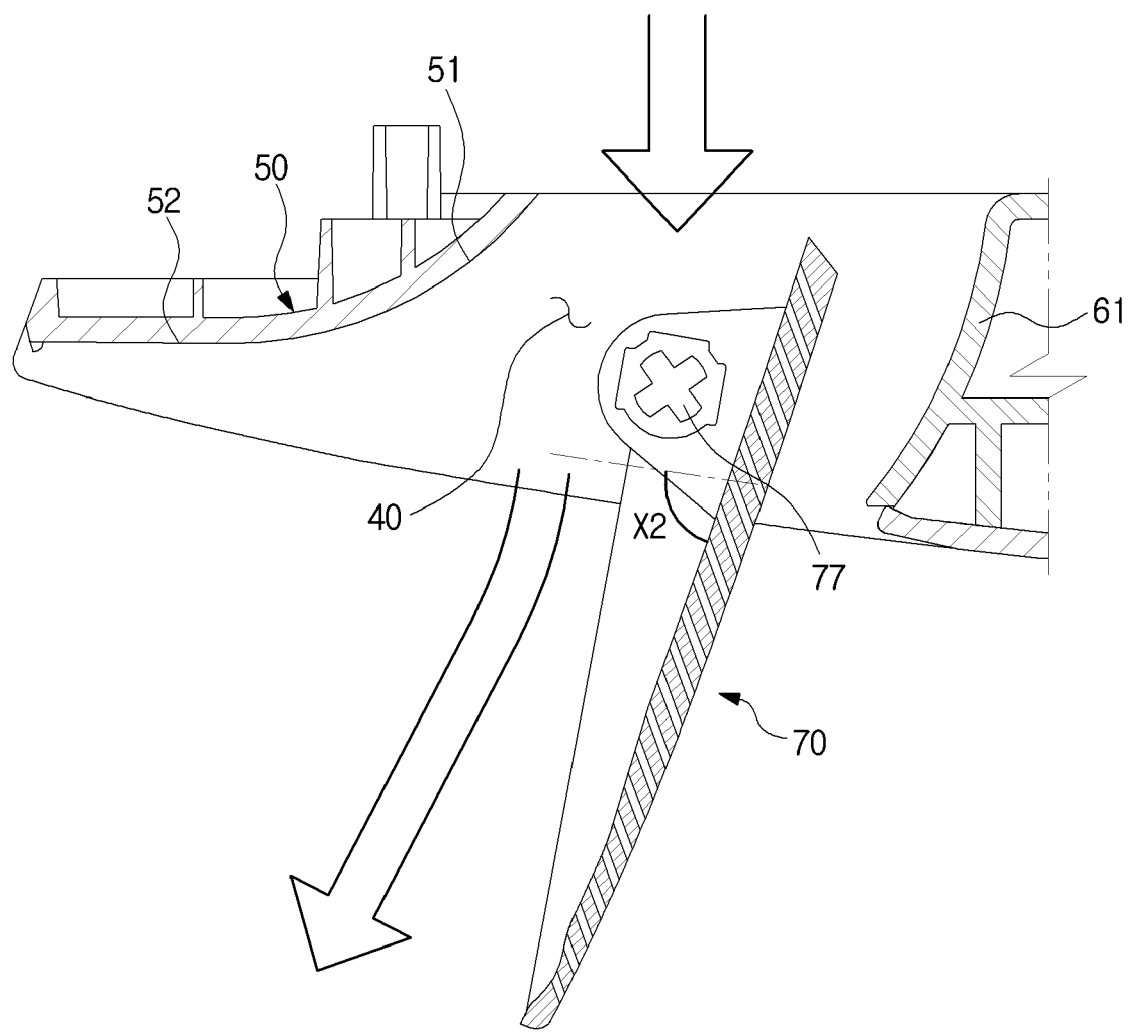
FIG. 12 shows a state of operating routine mode of the air conditioner of FIG. 1.

FIG. 10 shows a state of operating still air mode of the air conditioner of FIG. 1. FIG. 11 shows a state of operating long air flow mode of the air conditioner of FIG. 1. FIG. 12 shows a state of operating routine mode of the air conditioner of FIG. 1.

Referring to FIGS. 10 to 12, a state of operating an air conditioner of the present disclosure will now be described.

As shown in FIG. 10, in the still air mode of the air conditioner, the blade 70 may shut the outlet 40. When the blower fan 3 is activated while the blade 70 shuts the outlet 40, the air drawn in through the inlet 30 may go through heat exchange in the heat exchanger 2 and may then be discharged through the through holes 74 formed in the blade 70.

The air flowing by the blower fan 3 may slow down and may be reduced in amount due to resistance while passing the through holes 74 of the blade 70, so it may not reach the user as the direct airflow and may gradually cool or heat the room.

As shown in FIG. 11, in the long airflow mode of the air conditioner, the blade 70 may open the outlet 4 and have the air discharged near to the ceiling C through the outlet 40.

The open angle X1 of the blade 70 may be about 10 degrees or less, and accordingly, the air may be discharged near to the ceiling C through the outlet 40 and may horizontally flow to a far distance from the outlet 40. Accordingly, no direct airflow reaches the user and the indoor space may be gradually cooled or heated.

As shown in FIG. 12, in routine mode of the air conditioner, the blade 70 may open the outlet 40, in which case the open angle X2 of the blade 70 may vary between about 40 to 80 degrees. The direction of the air discharged through the outlet 40 may be controlled by varying the open angle X2 of the blade 70.

Figure 13:
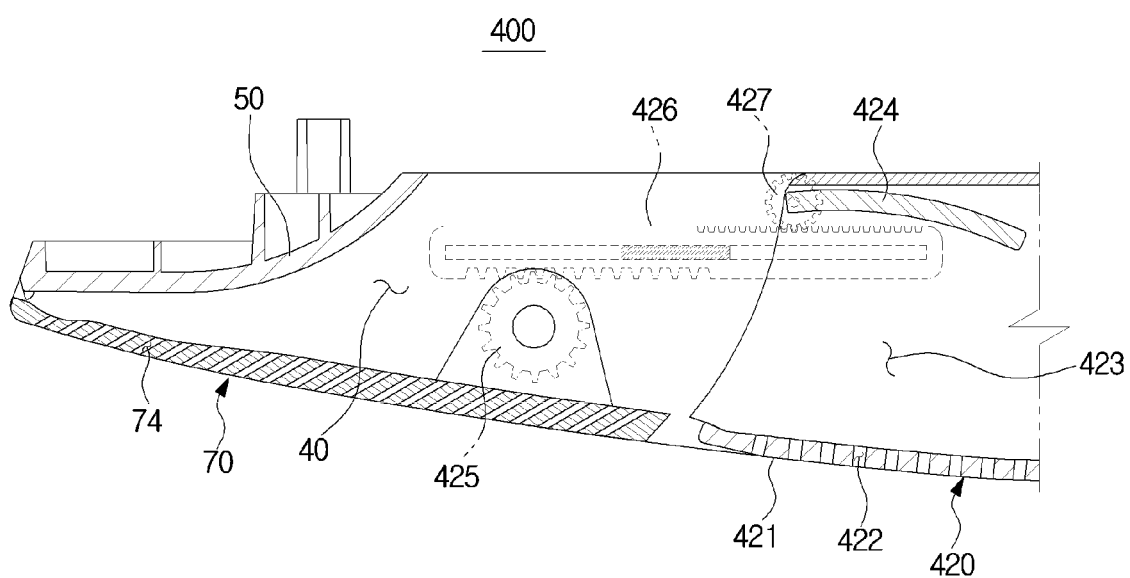
FIGS. 13 and 14 show an air conditioner according to another embodiment of the present disclosure.
Figure 14:
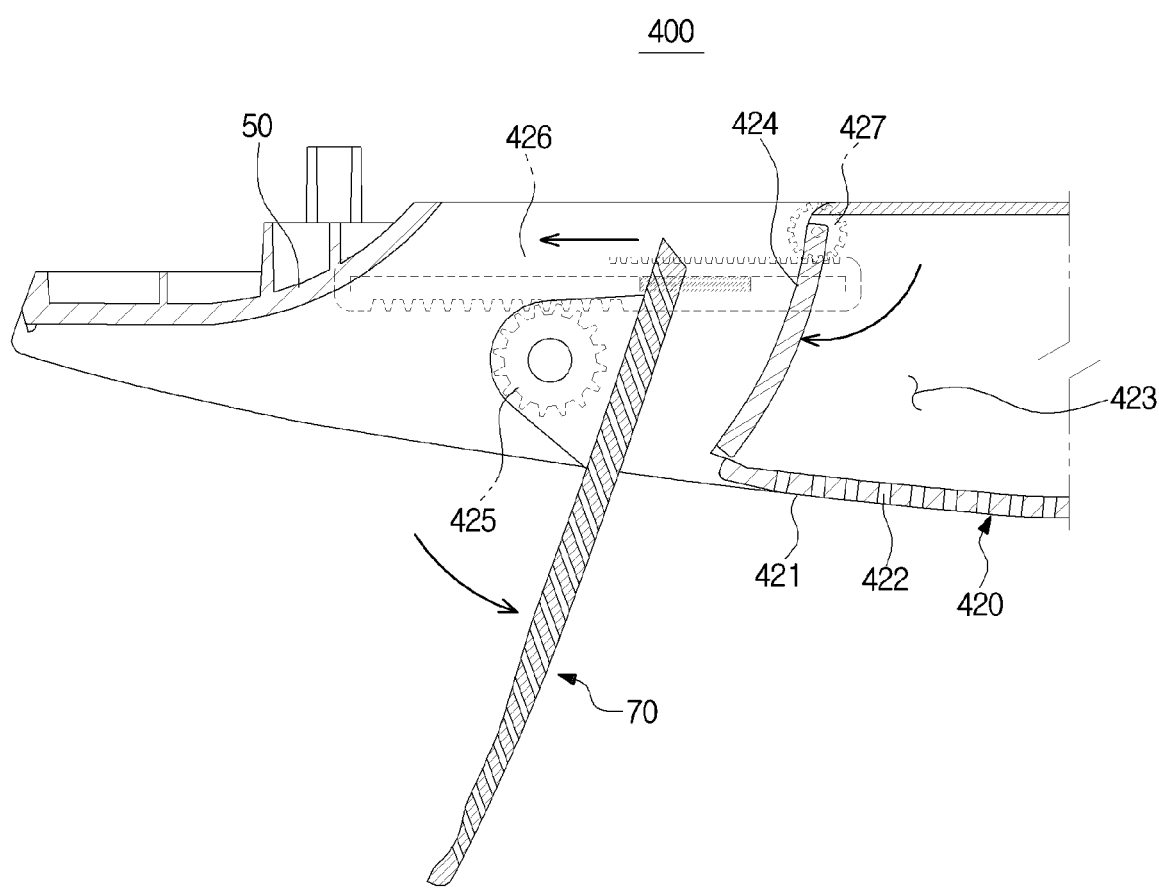

FIGS. 13 and 14 show an air conditioner according to another embodiment of the present disclosure: FIG. 13 shows a state of operating the still air mode, and FIG. 14 shows a state of operating the routine mode.

Referring to FIGS. 13 to 14, an air conditioner 400 in accordance with another embodiment of the present disclosure will now be described. The same features as in the aforementioned embodiment are denoted by the same reference numerals, and the overlapping description will be omitted herein.

A cover panel 420 may include a panel outlet 421 with a plurality of panel through holes 422 formed therein to discharge air out of the housing 10. The panel outlet 421 may be formed near the outlet 40.

The air conditioner 400 may include a panel discharge flow path 423 for guiding the air flowing by the blower fan 3 to the panel outlet 421, and an open/shut member 424 for opening and shutting the panel discharge flow path 423. The panel discharge flow path 423 may be formed to be linked to the outlet 40. The open/shut member 424 may be pivotally arranged to open and shut the panel discharge flow path 423.

As shown in FIG. 13, in the still air mode in which the blade 70 shuts the outlet 40, the open/shut member 424 may open the panel discharge flow path 423 for the air to be discharged through the panel through holes 422. Accordingly, the air flowing by the blower fan 3 may be discharged through the through holes 74 formed in the blade 70 and the panel through holes 422 formed in the cover panel 420. In this case, the amount of discharge air in the still air mode may increase as compared with the aforementioned embodiment.

As shown in FIG. 14, in the routine mode in which the blade 70 opens the outlet 40, the open/shut member 424 may shut the panel discharge flow path 423.

The open/shut member 424 may be configured to operate by being mechanically engaged with the operation of the blade 70. The open/shut member 424 may be configured such that when the open/shut member 424 and the blade 70 are mechanically engaged for the blade 70 to shut the outlet 40, the open/shut member 424 may open the panel discharge flow path 423, and when they are engaged for the blade 70 to open the outlet 40, the open/shut member 424 may shut the panel discharge flow path 423.

For example, the air conditioner 400 may include a first pinion gear 425 coupled with the pivot shaft of the blade 70 and rotated along with the blade 70, a second pinion gear 427 coupled with the pivot shaft of the open/shut member 424 and rotated along with the open/shut member 424, and a rack gear 426 for delivering the rotational force of the first pinion gear 425 to the second pinion gear 427. The air conditioner 400 is not, however, limited to this structure, and various engagement structures known to the public may be applied to the air conditioner 400.

Figure 15:
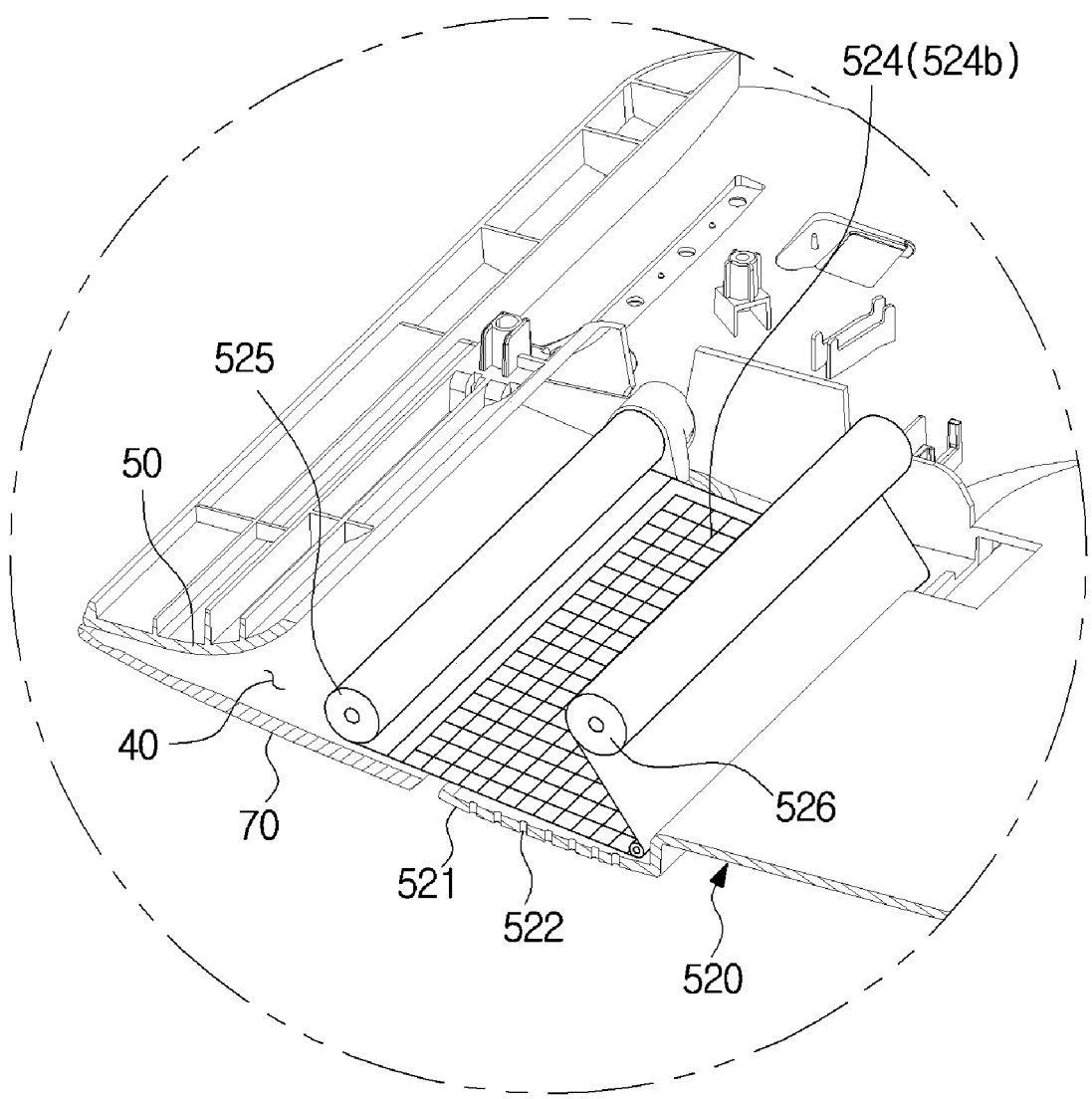
FIGS. 15 and 16 show an air conditioner according to another embodiment of the present disclosure.
Figure 16:
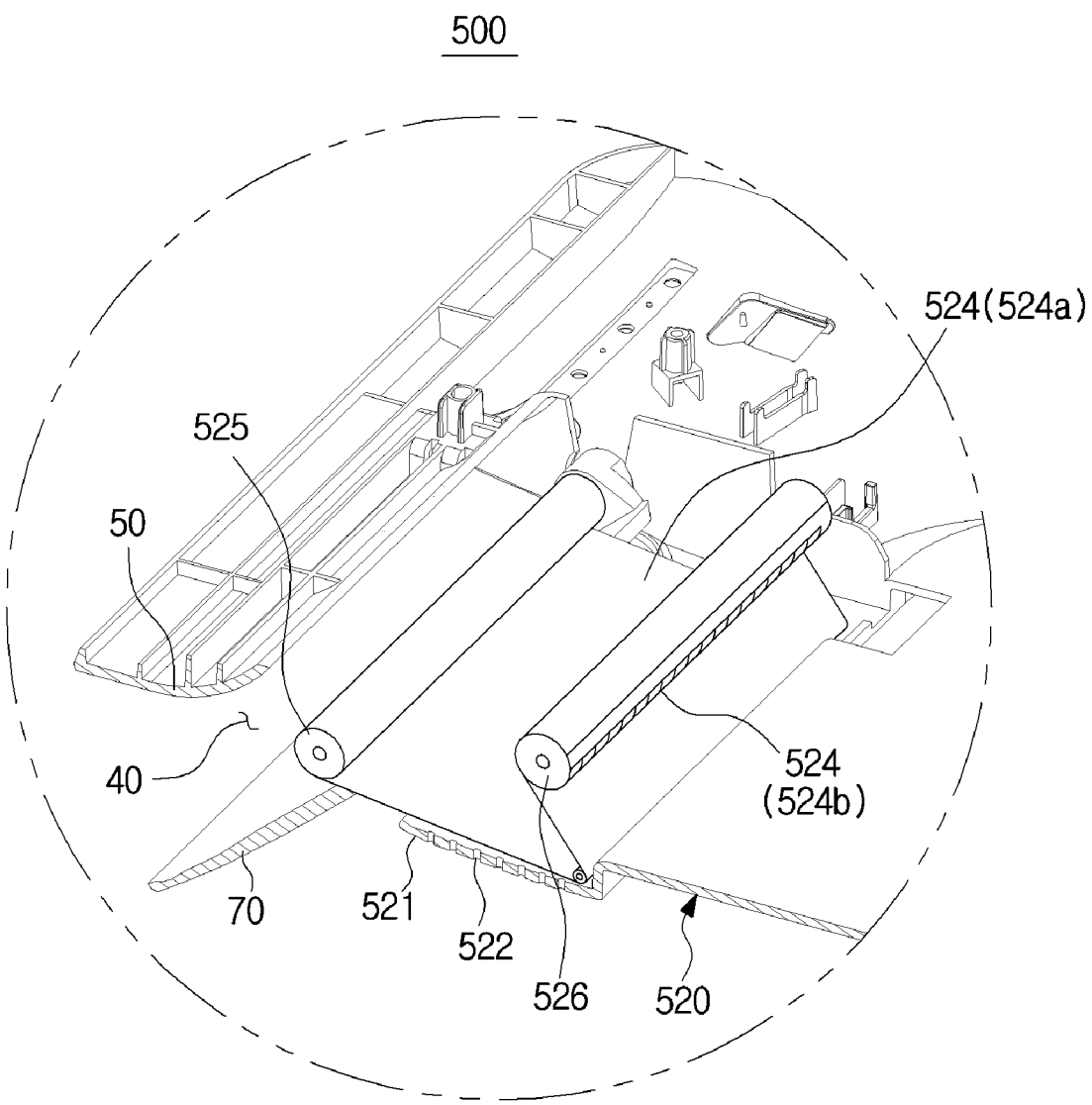

FIGS. 15 and 16 show an air conditioner according to another embodiment of the present disclosure: FIG. 15 shows a state of operating the still air mode, and FIG. 16 shows a state of operating the routine mode.

Referring to FIGS. 15 to 16, an air conditioner 500 in accordance with another embodiment of the present disclosure will now be described. The same features as in the aforementioned embodiment are denoted by the same reference numerals, and the overlapping description will be omitted herein.

A cover panel 520 may include a panel outlet 521 with a plurality of panel through holes 522 formed therein to discharge air out of the housing 10. The panel outlet 521 may be formed near the outlet 40.

The air conditioner 500 may include a panel discharge flow path for guiding the air flowing by the blower fan 3 to the panel outlet 521, and an open/shut member 524 for opening and shutting the panel discharge flow path. The panel discharge flow path may be formed to be linked to the outlet 40.

The open/shut member 524 may be arranged to open and shut the panel discharge flow path 523. The open/shut member 524 may be shaped like a roll screen. The open/shut member 524 may have an air passage disabled part 524a which disables air passage and an air passage enabled part 524b which enables air passage.

The open/shut member 524 may be configured to be wound on a plurality of rollers 525, 526, and to be moved such that the air passage disabled part 524a comes over the panel through holes 522 or the air passage enabled part 524b comes over the panel through holes 522 according to rotation of the plurality of rollers 525, 526.

As shown in FIG. 15, in the still air mode in which the blade 70 shuts the outlet 40, the air passage enabled part 524b of the open/shut member 524 may be located over the panel through holes 522 to allow the air to be discharged through the panel through holes 522.

Accordingly, the air flowing by the blower fan 3 may be discharged through the through holes 74 formed in the blade 70 and the panel through holes 522 formed in the cover panel 520. In this case, the amount of discharge air in the still air mode may increase as compared with the aforementioned embodiment.

As shown in FIG. 16, in the routine mode in which the blade 70 opens the outlet 40, the air passage disabled part 524a of the open/shut member 524 may be located over the panel through holes 522 to prevent the air from being discharged through the panel through holes 522.

Figure 17:
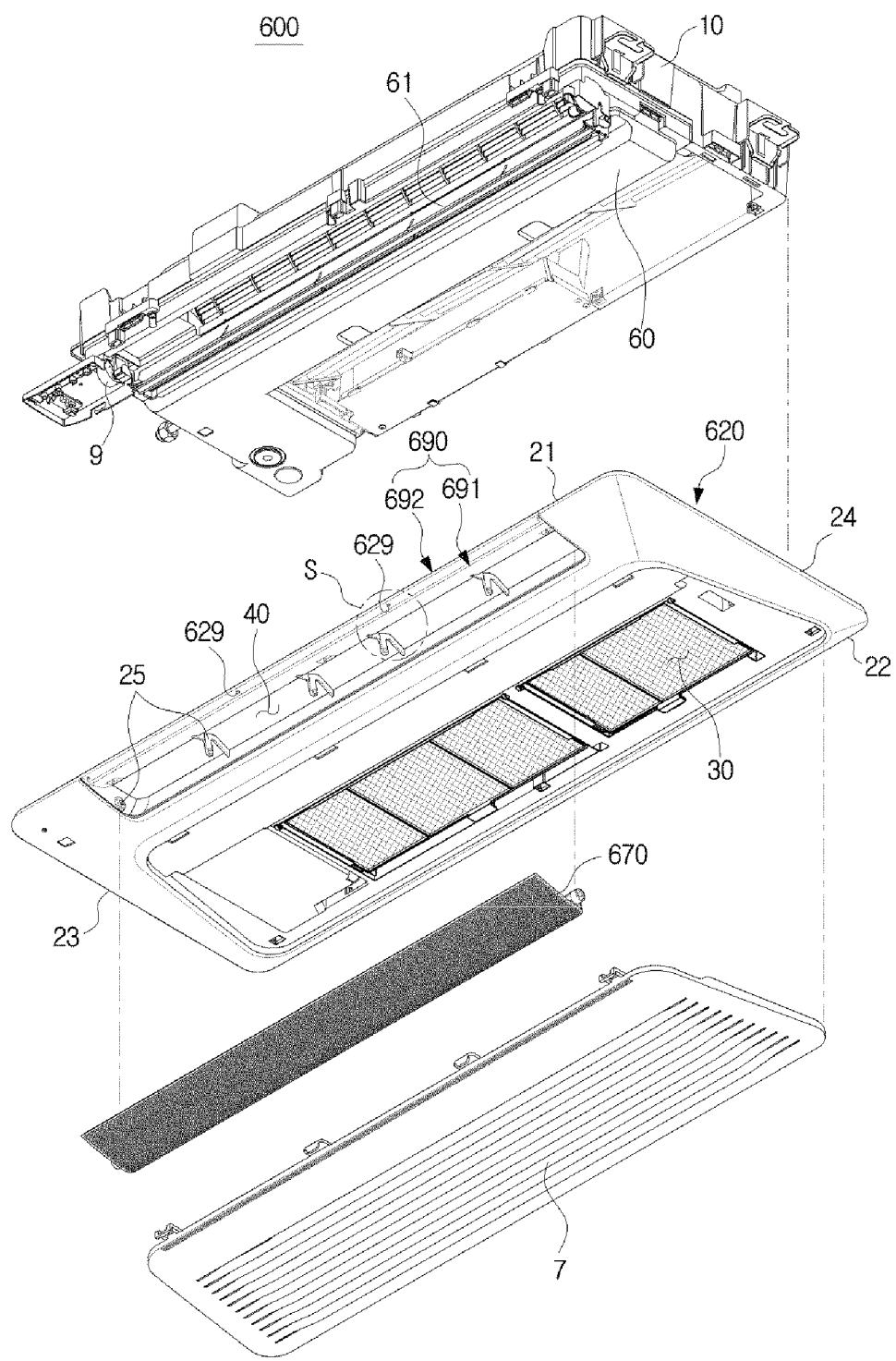
FIG. 17 shows an air conditioner according to another embodiment of the present disclosure with a cover panel and a blade separated therefrom.
Figure 18:
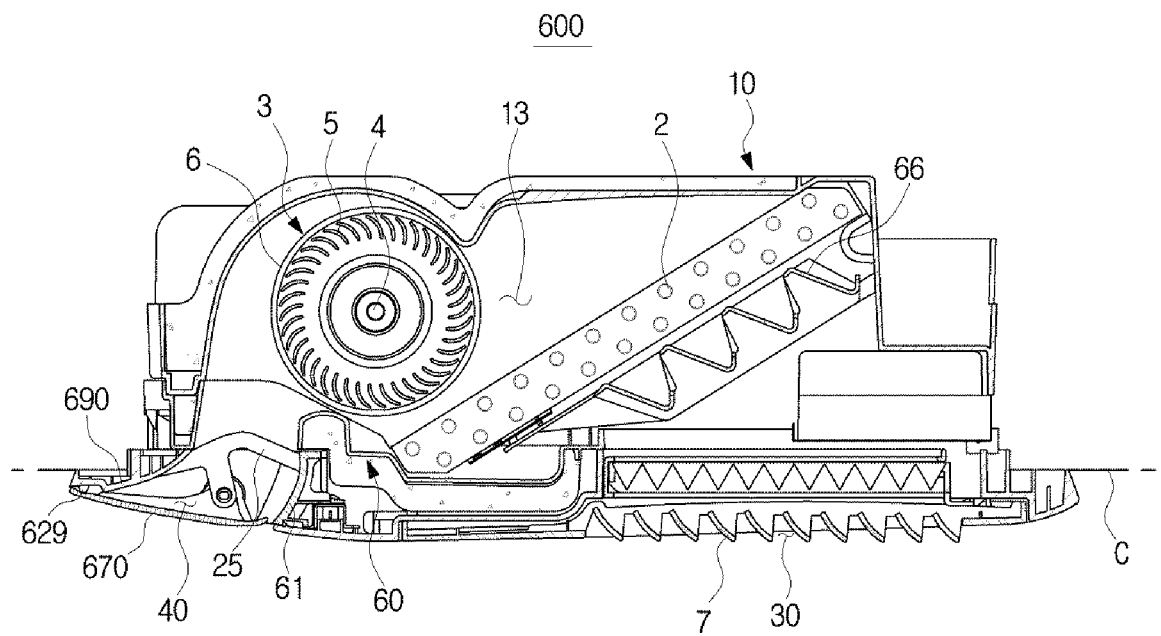
FIG. 18 is a side cross-sectional view illustrating main configurations of the air conditioner of FIG. 17.

FIG. 17 shows an air conditioner according to another embodiment of the present disclosure with a cover panel and a blade separated therefrom. FIG. 18 is a side cross-sectional view illustrating main configurations of the air conditioner of FIG. 17.

Referring to FIGS. 17 to 18, another embodiment of an air conditioner will now be described. The same features as in the aforementioned embodiments are denoted by the same reference numerals, and the overlapping description will be omitted herein.

An air conditioner 600 may include the housing 10 hung on or buried in the ceiling C, a cover panel 620 coupled with a lower portion of the housing 10 and equipped with the inlet 30 and the outlet 40, the heat exchanger 2 arranged inside the housing 10, and the blower fan 3 configured to draw in air into the housing 10 through the inlet 30 and discharge the air out of the housing 10 through the outlet 40.

The cover panel 620 may be coupled to the lower portion of the housing 10 to cover the open bottom of the housing 10. The cover panel 620 may have the form of a rectangle with front, back, left and right edges 21, 22, 23, and 24, and the edges 21 and 22 are formed to be longer than the other edges 23, 24.

The inlet 30 may be provided in the cover panel 620 to be close to the edge 22, and the outlet 40 may be provided in the cover panel 620 to be close to the edge 21. The outlet 40 may have an elongated form along the length of the edge 21, 22. A grill 7 may be coupled to the inlet 30 to filter out dust from the air drawn in.

The air conditioner 600 may include a blade 670 arranged on the outlet 40 to control the direction, speed, and amount of the air to be discharged through the outlet 40. The blade 670 may be pivotally arranged to open and shut the outlet 40. The blade 670 may be provided to open and shut the outlet 40 and may include a blade body 671 (see FIG. 20) with the plurality of through holes 674 formed therein and coupling ribs 676 (see FIG. 20) protruding from the blade body 671. In the case that air is discharged through the plurality of through holes 674, the speed of the air is low and the amount of the air is small, compared with the case where the air is discharged through the outlet 40.

The blower fan 3 draws in room air, facilitates heat exchange of the air through the heat exchanger 2, and discharges the heat-exchanged air back into the room. For this, the blower fan 3 needs to rotate at more than a certain rate (rpm) taking into account the heat exchange efficiency of the heat exchanger 2, and accordingly, discharges the air through the outlet 40 in the form of direct airflow to a certain distance.

On the contrary, the air discharged through the through holes 674 while the blade 670 shuts the outlet 40 is at a relatively low speed and is small in amount, so the direct air flow may not reach the user and the room may be slowly cooled or heated. In this way, the mode in which air is discharged through the through holes 674 prevents the direct airflow from reaching the user, and may thus be referred to as wind-free mode or still air mode.

According to American Society of Heating, Refrigerating, and Air-Conditioning Engineers (ASHRAE), the wind flowing at about 0.15 m/s or less without cold draft that causes unwanted cooling of a body with a cold air current, is called still air. In an embodiment of the present disclosure, the air conditioner may be configured to meet the still air condition (i.e., 0.15 m/s) of the ASHRAE in a residential indoor space more than one meter away from the air conditioner in the still air mode.

For this, in addition to the structure of the through holes 674 formed in the blade 670, the air conditioner 600 may further include an airflow controller 690 of the cover panel 620 to create a still air current more effectively.

The airflow controller 690 may be located adjacent to the outlet 40 to reduce speed of the air discharged through the plurality of through holes 674 and may include a first airflow controller 691 and a second airflow controller 692. The second airflow controller 692 may be located further down in the downstream of the outlet 40 than the first airflow controller 691 is.

An air current E2 (sew FIG. 23) may be created by the airflow controller 690 to wrap around the blade 670. The air current E2 wrapping around the blade 670 may be discharged through a gap G2 (see FIG. 21) between the cover panel 620 and the blade 670. Reference numeral 629 denotes a space maintainer protrusion to maintain the gap G2 between the cover panel 620 and the blade 670 even while the blade 670 is shut.

The airflow controller 690 in accordance with an embodiment of the present disclosure will now be described with reference to related drawings.

Figure 19:
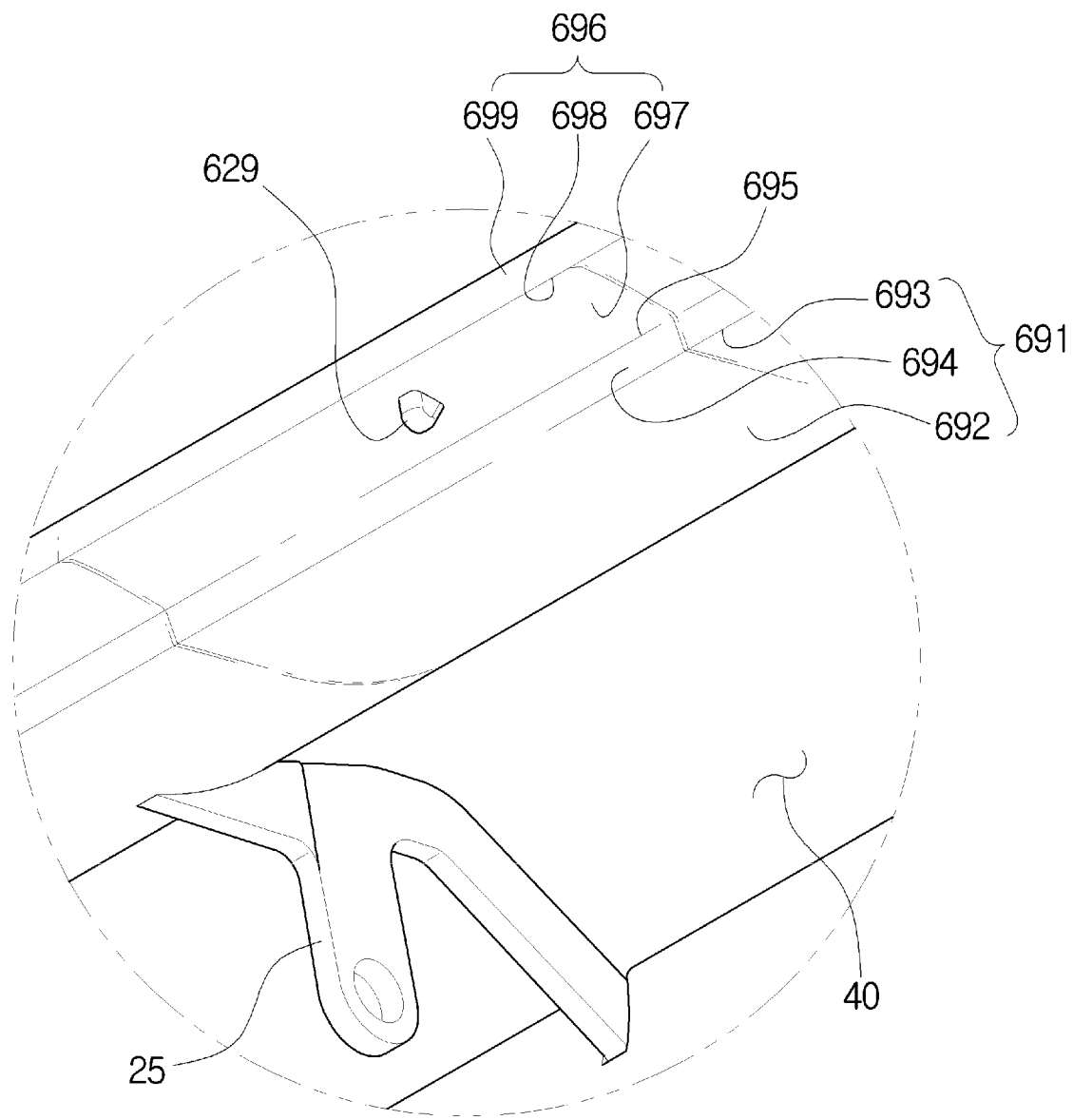
FIG. 19 is an enlarged view of portion 'S' of FIG. 17.
Figure 20:
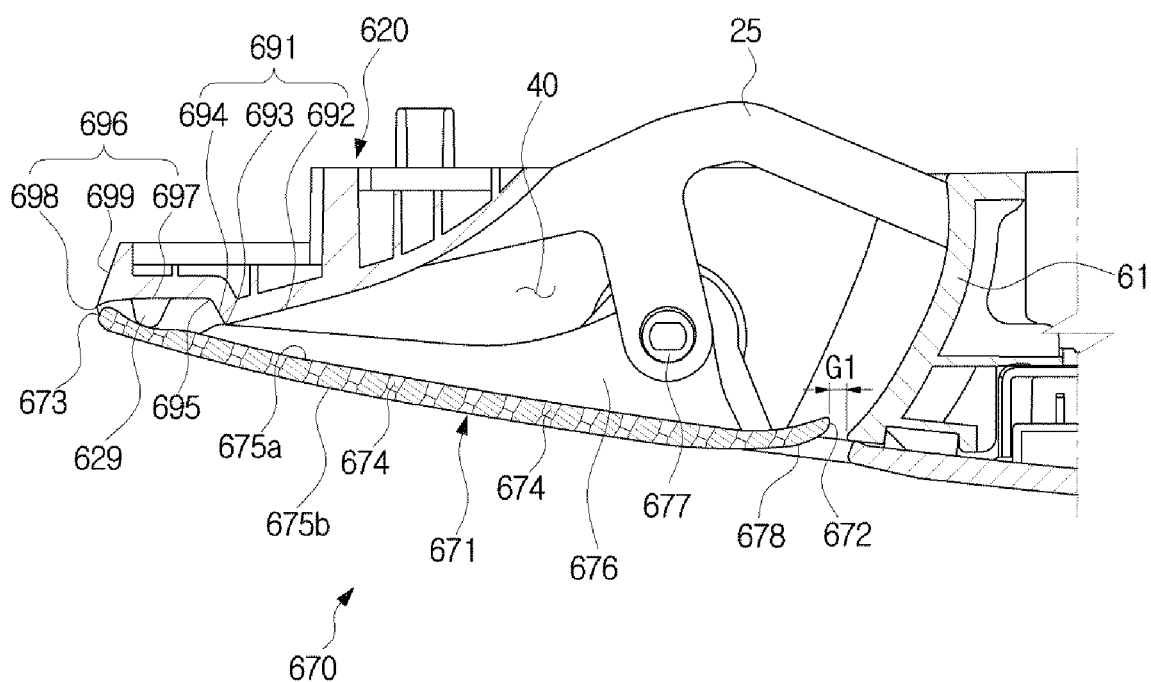
FIG. 20 is a side cross-sectional view of an enlarged perimeter of an outlet of the air conditioner of FIG. 17.
Figure 21:
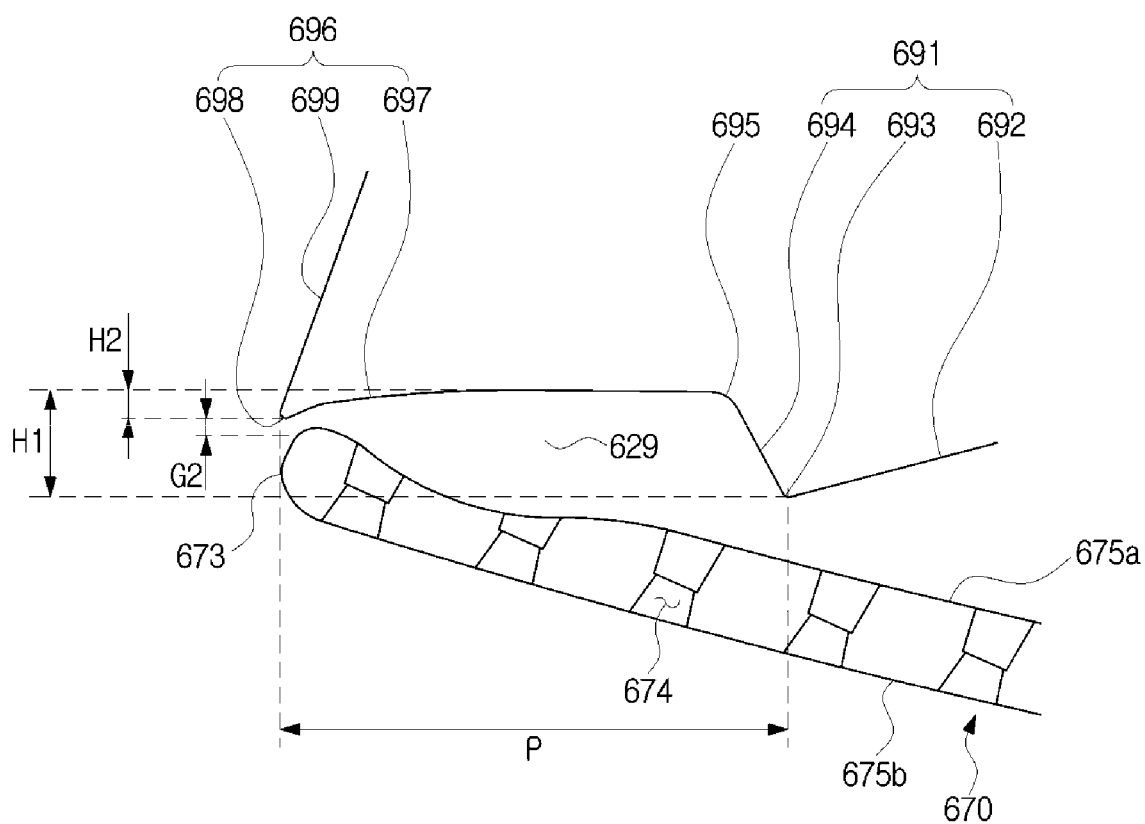
FIG. 21 is a side cross-sectional view of an enlarged airflow controller of the air conditioner of FIG. 17.
Figure 22:
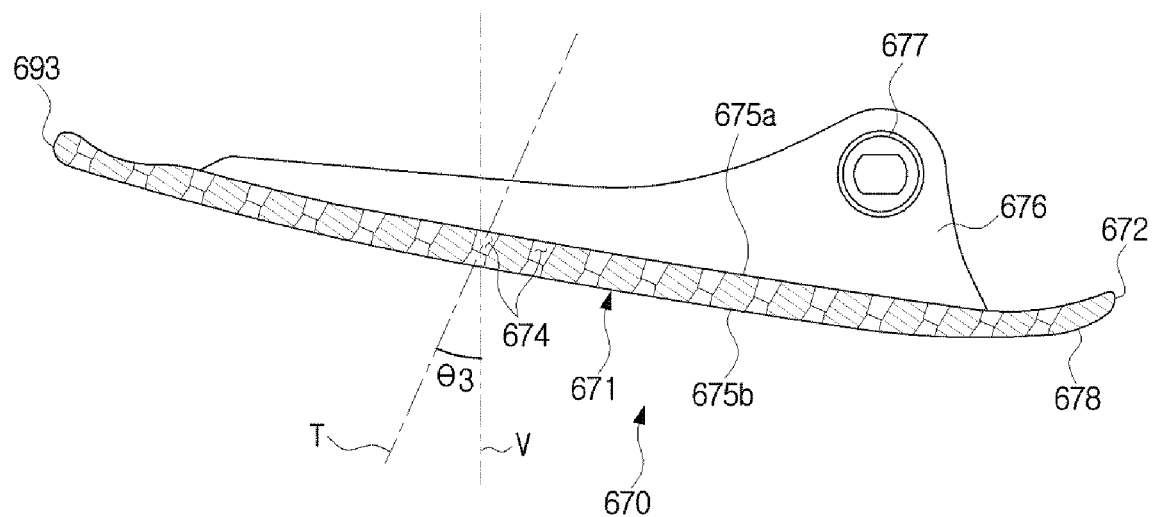
FIG. 22 shows inclination of through holes of the air conditioner of FIG. 17.
Figure 23:
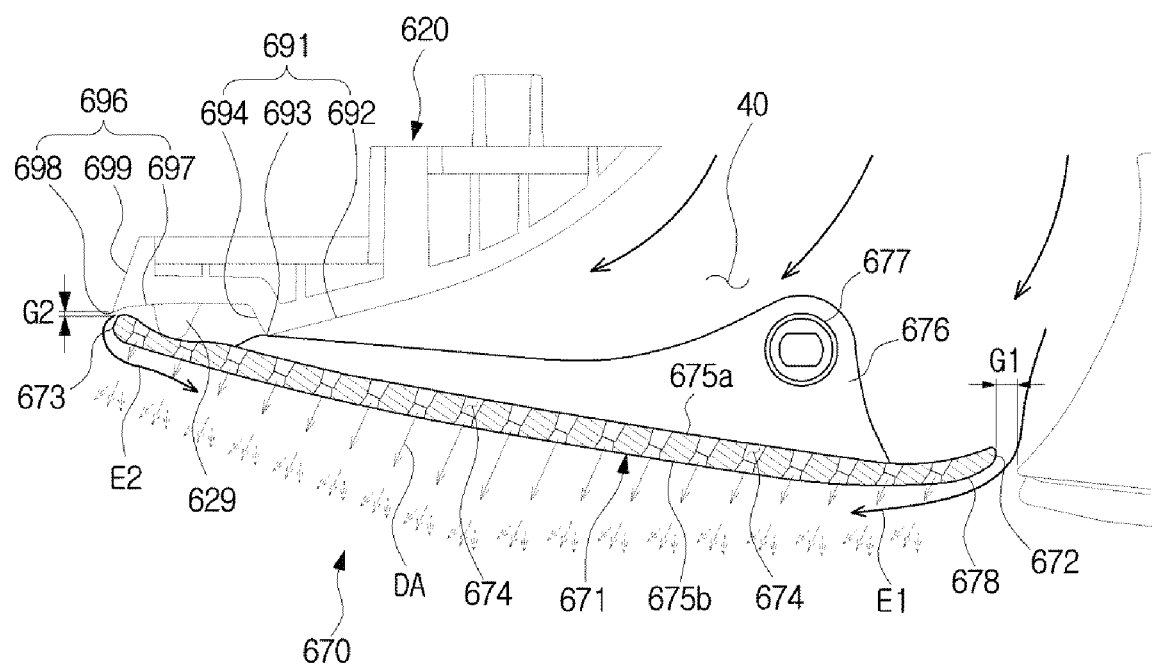
FIG. 23 shows flows of air around the outlet of the the air conditioner of FIG. 17.

FIG. 19 is an enlarged view of portion 'S' of FIG. 17. FIG. 20 is a side cross-sectional view of an enlarged perimeter of the outlet of the air conditioner of FIG. 17. FIG. 21 is a side cross-sectional view of the enlarged airflow controller of the air conditioner of FIG. 17. FIG. 22 shows inclination of through holes of the air conditioner of FIG. 17. FIG. 23 shows air flows around the outlet of the air conditioner of FIG. 17.

While the air conditioner 600 is in the still air mode, i.e., while the blade 670 is shut, the gap G2 may be formed between the edge 21 (see FIG. 17) of the cover panel 620 near the exit 40 and an outer end 673 (see FIG. 20) of the blade 670. The air current E2 wrapping around the blade 670 may be discharged through the gap G2. The air current E2 wrapping around the blade 670 may reduce the speed of an air discharge flow DA (see FIG. 23) discharged through the plurality of through holes 674, and may further curb the phenomenon of dew condensation on the blade 670 due to a temperature difference.

The cover panel 620 includes the airflow controller 690 to create this air current E2 to wrap around the blade 670. The airflow controller 690 may be located adjacent to the outlet 40 to reduce speed of the air discharged through the plurality of through holes 674 and may include the first airflow controller 691 and the second airflow controller 696. The second airflow controller 696 may be placed further down in the downstream of the outlet 40 than the first airflow controller 691 is.

The first airflow controller 691 may reduce the speed of air flowing from inside the exit 40 toward the second airflow controller 696. This may help change the direction of airflow in the second airflow controller 696.

The first airflow controller 691 may include a first descending surface 692, a first low point portion 693, and a first ascending surface 694. The first descending surface 692, the first point portion 693, and the first ascending surface 694 may be continuously formed in the downstream direction from the upstream side.

While the blade 670 of the air conditioner 600 installed horizontally on the ceiling is shut, the first low point portion 693 may be at the lowest level among the first descending surface 692, the first point portion 693, and the first ascending surface 694. The first descending surface 692 may be formed further up on the upstream side than the first low point portion 693 is, and may descend as it grows near the first low point portion 693. The first ascending surface 694 may be formed further down on the downstream side than the first low point portion 693 is, and may ascend as it grows far from the first low point portion 693.

The first descending surface 692 and the first ascending surface 694 may be formed as flat planes or curved planes. The first low point portion 693 may be formed as a straight line or a curve to connect the first descending surface 692 and the first ascending surface 694.

Consequently, the first airflow controller 691 may have a structure that protrudes toward the exit 40, and accordingly, the air flowing from inside the exit 40 toward the second airflow controller 696 past the first airflow controller 691 may slow down by the protruding first airflow controller 691.

The second airflow controller 696 may guide the direction of the air discharged through the gap G2 between the cover panel 620 and the blade 670. While the air conditioner 600 is in the still air mode, i.e., while the blade 670 is shut, the gap G2 may be formed between the edge 21 (see FIG. 17) of the cover panel 620 near the exit 40 and the outer end 673 (see FIG. 20) of the blade 670. The second airflow controller 696 may guide the air discharged through the gap G2 to flow in a direction to wrap around the blade 670.

The air discharged through the gap G2 may flow from the end 673 of the blade 670 toward the center portion along the outer side 675b of the blade body 671. The air current E2 guided by the second airflow controller 696 to wrap around the blade 670 may disturb and slow down the air discharge current DA discharged through the through holes 674.

Furthermore, the air current E2 wrapping around the blade 670 may block the blade 670 from hot and humid outside air and thus curb the phenomenon of dew condensation on the blade 670.

The second airflow controller 696 may include a second descending surface 697, a second low point portion 698, and a second ascending surface 699. The second descending surface 697, the second point portion 698, and the second ascending surface 699 may be continuously formed in the downstream direction from the upstream side.

While the blade 670 of the air conditioner 600 installed horizontally on the ceiling is shut, the second low point portion 698 may be at the lowest level among the second descending surface 697, the second point portion 698, and the second ascending surface 699. The second descending surface 697 may be formed further up on the upstream side than the second low point portion 698 is, and may descend as it grows near the second low point portion 698. The second ascending surface 699 may be formed further down on the downstream side than the second low point portion 698 is, and may ascend as it grows far from the second low point portion 698.

The second descending surface 697 and the second ascending surface 699 may be formed as flat planes or curved planes. However, it is desirable that the second descending surface 697 is formed as a curved plane swollen upward to change the direction of an airflow toward the blade 670. The second low point portion 698 may be formed as a straight line or a curve to connect the second descending surface 697 and the second ascending surface 699. As a result, the second airflow controller 696 may have a structure that protrudes toward the exit 40.

The air that has passed the gap G2 may come close to the blade 670 by the second airflow controller 696 and may flow to the center portion of the blade 670 along the outer side 675b of the blade body 671 according to the Coanda effect.

The airflow controller 690 may include a high point portion 695 where the first ascending surface 694 of the first airflow controller 691 and the first descending surface 696 of the second airflow controller 696 meet. The high point portion 695 may be formed as a straight line or a curve.

While the blade 670 of the air conditioner 600 installed horizontally on the ceiling is shut, the height point portion 695 may be formed at a higher level than the first low point portion 693 and the second low point portion 698.

As shown in FIG. 21, to meet the still air condition of the ASHRAE in a residential indoor space more than one meter away from the air conditioner, it may be preferable that $0.001 \leq |H1-H2|/H1 \leq 100$. H1 denotes a difference in height between the first low point portion 693 and the high point portion 695, and H2 denotes a difference in height between the second low point portion 698 and the high point portion 695.

Furthermore, it is preferable that $0.001 \leq P/H1 \leq 500$. P denotes a horizontal distance of the first low point portion 693 and the second low point portion 698.

As such, since the air current E2 formed by the airflow controller 690 to wrap around the blade 670 is discharged through the gap G2 between the cover panel 620 and the blade 670 while the blade 670 is shut, the gap G2 between the cover panel 620 and the blade 670 needs to be formed and maintained while the blade 670 is shut.

For this, as described above, the protruding space maintainer protrusion 629 may be formed on the cover panel 620 to form and maintain the gap G2 between the cover panel 620 and the blade 670 by coming into contact with the blade 670 when the blade 670 is shut.

There may be at least one space maintainer protrusion 629 formed along the length of the exit 40. Alternatively, the space maintainer protrusion 629 may be formed not on the cover panel 620 but on the blade 670.

The airflow controller 690 of the cover panel 620 may create the air current E2 around the outer end 673 of the blade 670 to wrap around the blade 670, and in an embodiment of the present disclosure, the blade 670 may have a blade air direction controller 678 to create an air current E1 around an inner end 672 of the blade 670 to wrap around the blade 670.

As described above, the outer end 673 of the blade 670 is an end relatively far from a pivot shaft portion 677 of the blade 670, and the inner end 672 of the blade 670 is an end relatively close to the pivot shaft portion 677 of the blade 670. Furthermore, while the blade 670 is shut, the outer end 673 is farther away from the inlet 30 than the inner end 672 is.

The air current from inside the outlet 40 toward the outer end 673 of the blade 670 is more inclined and the air current toward the inner end 673 of the blade 670 is less inclined.

In FIG. 23, the blade air direction controller 678 may guide the air discharged through a gap G1 between the cover panel 620 and the inner end 672 of the blade 670 to a direction to wrap around the blade 670.

The air discharged through the gap G1 may flow from the end 672 of the blade 670 toward the center portion along the outer side 675b of the blade body 671. The air current E1 guided by the blade air direction controller 678 to wrap around the blade 670 may disturb and slow down the air discharge current DA discharged through the through holes 674.

Furthermore, the air current E1 wrapping around the blade 670 may block the blade 670 from hot and humid outside air and thus curb the phenomenon of dew condensation on the blade 670.

The blade air direction controller 678 may be formed at the inner end 672 of the blade 670 as a plane concavely curbed toward the pivot shaft portion 677, which is the center of pivoting of the blade 670.

The air that has passed the gap G1 may come close to the blade 670 by the blade air direction controller 678 and may flow to the center portion of the blade 670 along the outer side 675b of the blade body 671 according to the Coanda effect.

With the structure of the outlet in accordance with the embodiment of the present disclosure, a smaller amount of air flows to the outer end 673 than to the inner end 672, so the air passing the through holes 674 formed near the outer end 673 may have a slower speed than the air passing the through holes 674 formed near the inner end 672. Furthermore, more dew condensation may occur around the outer end 673 than around the inner end 672 due to the temperature difference.

In order to slow down the air discharge current around the inner end 672 to effectively create a still air current while curbing dew condensation on the blade 670 around the outer end 673, the through holes 674 may be formed to be inclined toward the outer end 673 as they grow farther from the blower fan 3. Accordingly, the speed and amount of the air discharged toward the inner end 672 may be reduced, thereby effectively creating the still air current, and the speed and amount of the air discharged toward the outer end 673 may increase, thereby minimizing dew condensation.

While the blade 670 of the air conditioner 600 horizontally installed on the ceiling is shut, the inclination axis T (see FIG. 22) of the through holes 673 may form an angle θ3 with the vertical line V, the angle θ3 being in a range between around 5 to 45 degrees. Preferably, the angle θ3 may be about 25 degrees.

Reference numeral 675a denotes an inner side of the blade body 671.

According to embodiments of the present disclosure, an air conditioner may discharge air in various ways by differing the direction, speed, and/or amount of the air.

According to embodiments of the present disclosure, an air conditioner may create still air to prevent unwanted cooling with a cold airflow in residential indoor space.

According to embodiments of the present disclosure, an air current discharged through an outlet may be guided to a blade to curb the phenomenon of dew condensation on the blade.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. An air conditioner comprising:
a housing to be mounted on or embedded in a ceiling;
a cover panel coupled to a lower portion of the housing, the cover panel including an inlet, an outlet and an edge close to the outlet;
a fan configured to draw in air into the housing through the inlet and discharge air out of the housing through the outlet; and
a blade configured to open and close the outlet, the blade including a blade body and a plurality of through holes formed in the blade body to control the air discharged out of the housing through the outlet while the blade closes the outlet, the blade body including an inner end and an outer end, the outer end being farther from a pivot shaft portion of the blade than the inner end is from the pivot shaft portion of the blade, and
wherein the air conditioner operates in every one of the following modes:
a still air mode in which the blade moves to cover the outlet and the fan is activated so that air flows through the plurality of through holes, wherein, in the still air mode, the outer end covers the edge of the cover panel;
a long airflow mode in which the blade moves to open the outlet and the fan is activated to allow air to flow out of the outlet along the ceiling; and
a routine mode in which the blade moves to open the outlet and the fan is activated to allow air to flow downwards away from the ceiling.

2. The air conditioner of claim 1, wherein the cover panel comprises a guide forming the outlet, the guide extending from an upstream end of the outlet to a downstream end of the outlet,
wherein the guide comprises a first guide surface arranged to guide air in a first direction and a second guide surface arranged to change the first direction of the air guided by the first guide surface into a second direction, and
wherein the second direction is nearer to the ceiling than the first direction.

3. The air conditioner of claim 2, wherein the second guide surface has an inclination smaller than an inclination of the first guide surface.

4. The air conditioner of claim 2, wherein the first guide surface is formed to be more curved than the second guide surface.

5. The air conditioner of claim 4, wherein the first guide surface is formed to have less inclination of a tangent at a portion of the first guide surface that is farther from the fan.

6. The air conditioner of claim 4, wherein the second guide surface is formed to be parallel with the ceiling.

7. The air conditioner of claim 4, wherein the second guide surface is formed to incline more at a portion of the second guide surface that is farther from the fan.

8. The air conditioner of claim 1, wherein the blade comprises:
coupling ribs protruding from the blade body, and
wherein the outer end is at a farther distance away from the inlet than the inner end.

9. The air conditioner of claim 8, wherein a thickness of the outer end is smaller than a thickness of the inner end.

10. The air conditioner of claim 8, wherein the blade body has a section with increasing thickness in a direction from the outer end toward the inner end.

11. The air conditioner of claim 8, wherein through holes, among the plurality of through holes, that are farther from the fan are formed to incline toward the outer end.

* * * * *